US012693840B2

(12) United States Patent　　(10) Patent No.: US 12,693,840 B2
Natsume et al.　　(45) Date of Patent: Jul. 28, 2026

(54) ROBOT PROGRAM GENERATION SYSTEM, ROBOT PROGRAM GENERATION METHOD, PROTOCOL CONVERSION DETERMINATION DEVICE, ROBOT PROGRAM, PROTOCOL, AND MANUFACTURING SYSTEM

(71) Applicant: KABUSHIKI KAISHA YASKAWA DENKI, Fukuoka (JP)

(72) Inventors: Tohru Natsume, Tokyo (JP); Kenji Matsukuma, Tokyo (JP); Sakae Yamaguchi, Tokyo (JP)

(73) Assignee: KABUSHIKI KAISHA YASKAWA DENKI, Fukuoka (JP)

( * ) Notice: Subject to any disclaimer, the term of this patent is extended or adjusted under 35 U.S.C. 154(b) by 223 days.

(21) Appl. No.: 18/684,049

(22) PCT Filed: Aug. 20, 2021

(86) PCT No.: PCT/JP2021/030528
§ 371 (c)(1),
(2) Date: Feb. 15, 2024

(87) PCT Pub. No.: WO2023/021681
PCT Pub. Date: Feb. 23, 2023

(65) Prior Publication Data
US 2024/0362001 A1　Oct. 31, 2024

(51) Int. Cl.
　*G06F 9/44*　(2018.01)
　*G06F 8/51*　(2018.01)
(52) U.S. Cl.
　CPC ..................................... *G06F 8/51* (2013.01)
(58) Field of Classification Search
　CPC ....................................................... G06F 8/51
　See application file for complete search history.

(56) References Cited

U.S. PATENT DOCUMENTS

| 11,699,295 | B1 * | 7/2023 | Cosic | ................. | G06V 30/1916 |
| | | | | | 382/157 |
| 2014/0172167 | A1 * | 6/2014 | Matsukuma | ............. | B25J 9/161 |
| | | | | | 700/259 |

(Continued)

FOREIGN PATENT DOCUMENTS

| EP | 1188126 B1 | 4/2005 |
| JP | 7-261820 A | 10/1995 |

(Continued)

OTHER PUBLICATIONS

Extended European Search Report issued in corresponding European Patent Application No. 21954249.5 mailed Jun. 12, 2025 (12 pages).

(Continued)

*Primary Examiner* — Qamrun Nahar
(74) *Attorney, Agent, or Firm* — Osha Bergman Watanabe & Burton LLP

(57)　　ABSTRACT

A robot program generation system and the like. Provided are a first conversion unit configured to convert a protocol representing multiple pieces of work in the field of biological engineering into a first program executable by a first robot, a protocol modification information acquisition unit configured to acquire, to modify the protocol after the first robot performs the multiple pieces of work according to the first program, modification information for at least one of a basic operation for performing the pieces of work and is for an instrument used by the first robot for the pieces of work or a supplementary operation that supplements the basic operation, a protocol modification unit configured to modify the protocol according to the modification information acquired, and a second conversion unit configured to convert the protocol modified into a second program executable by a second robot, or different from the first robot.

11 Claims, 31 Drawing Sheets

(56) References Cited

U.S. PATENT DOCUMENTS

2016/0349231 A1*  12/2016  Deister  ............ G01N 33/56966
2018/0281190 A1*  10/2018  Kakisaka  .................. B25J 9/16
2021/0040435 A1    2/2021  Ball et al.

FOREIGN PATENT DOCUMENTS

| JP | H07-261820 A | 10/1995 |
|----|----|----|
| JP | 2007-226290 A | 9/2007 |
| JP | 2009-172721 A | 8/2009 |
| JP | 2014-117781 A | 6/2014 |
| JP | 2018-521685 A | 8/2018 |
| JP | 2018-167361 A | 11/2018 |
| WO | 2021/136932 A1 | 7/2021 |

OTHER PUBLICATIONS

Mehr S., et al. "A universal system for digitization and automatic execution of the chemical synthesis literature" Science—Author Manuscript, vol. 370, No. 6512, Oct. 2, 2020 (Oct. 2, 2020), pp. 101-108 (9 pages).
International Search Report; Nov. 2, 2021; PCT/JP2021/030528.
Notice of Reasons for Refusal for JP Application No. 2021-568382; Dec. 20, 2021.
Notice of Reasons for Refusal for JP Application No. 2021-568382; Apr. 18, 2022.

* cited by examiner

[FIG. 3]
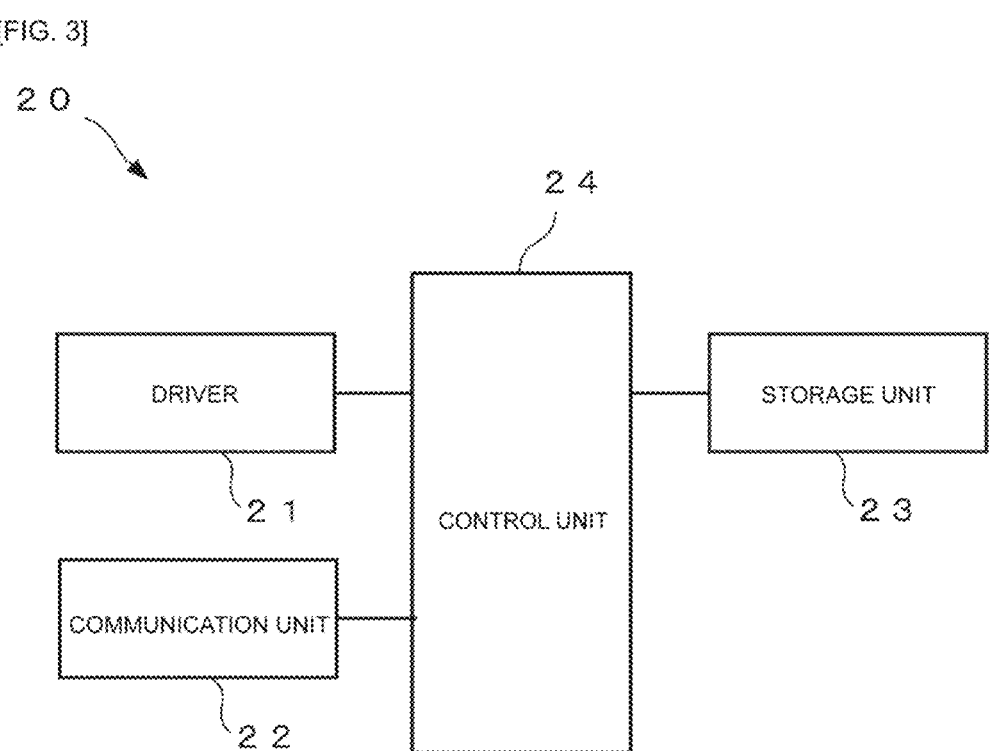

[FIG. 4]

[FIG. 5]
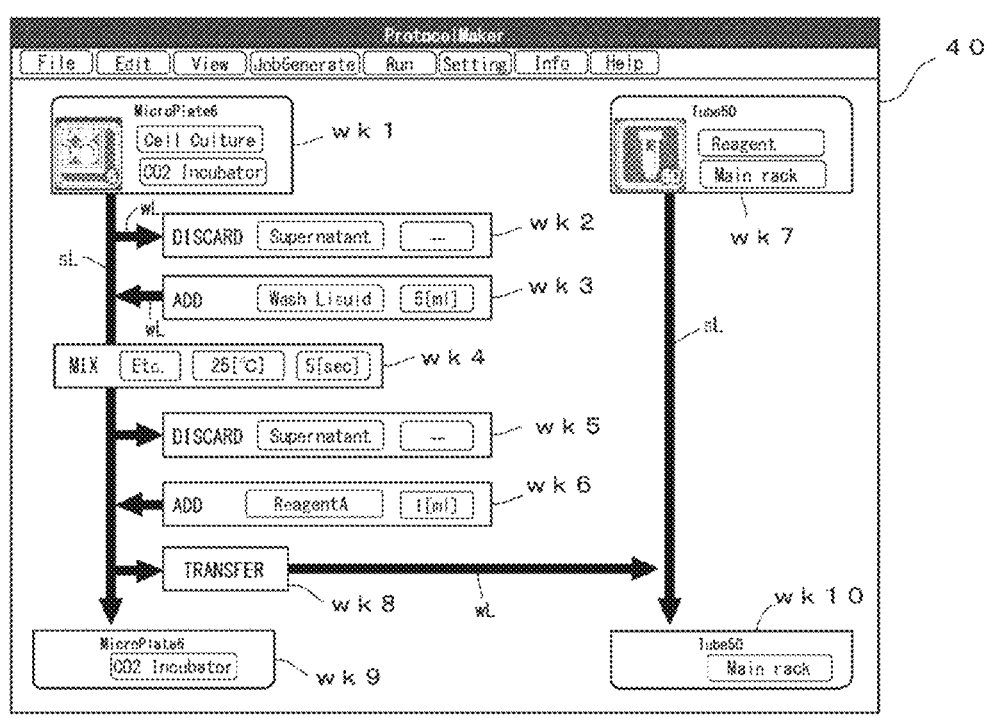
[FIG. 6A]
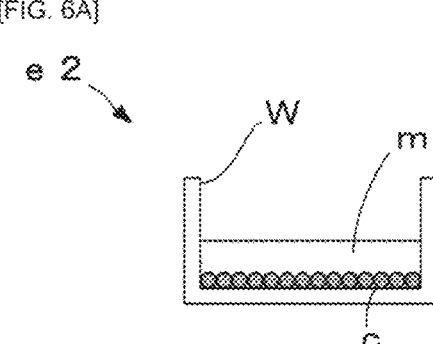

[FIG. 6B]
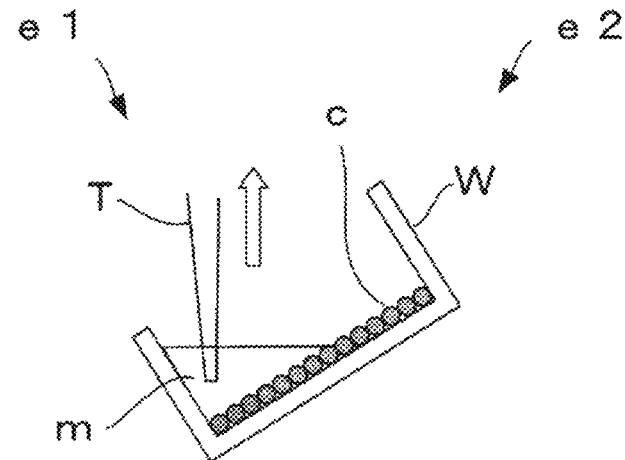
[FIG. 6C]
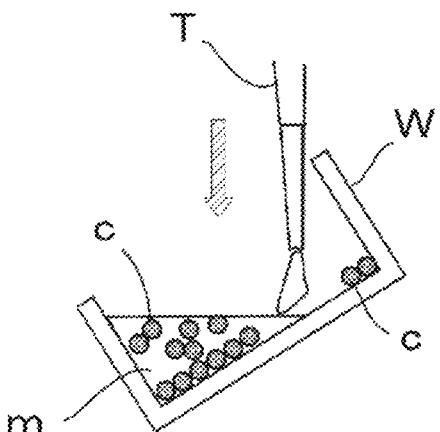

[FIG. 6D]
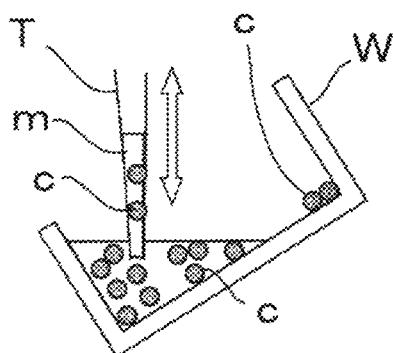
[FIG. 6E]
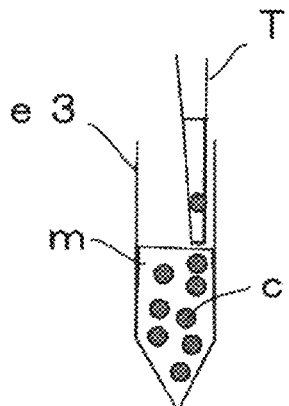

[FIG. 7]
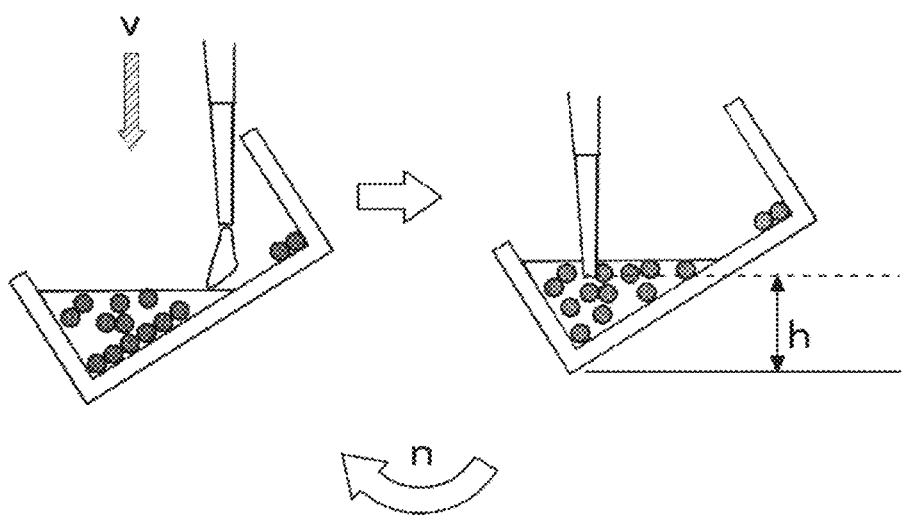
[FIG. 8]
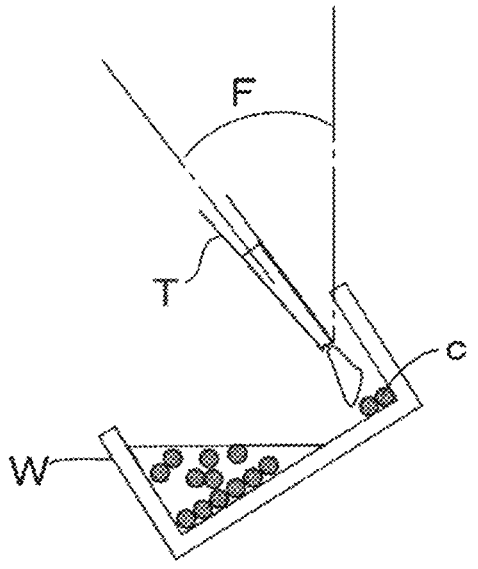

[FIG. 9A]
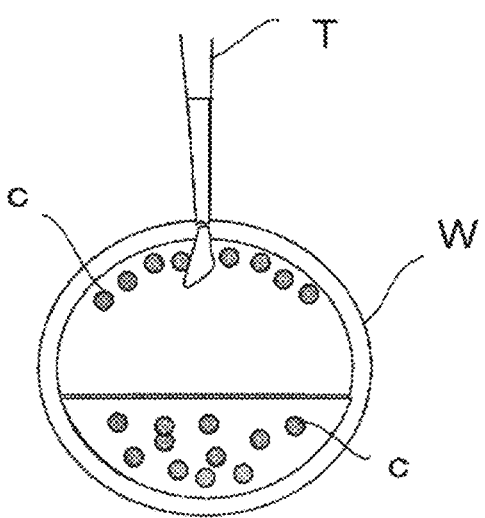
[FIG. 9B]
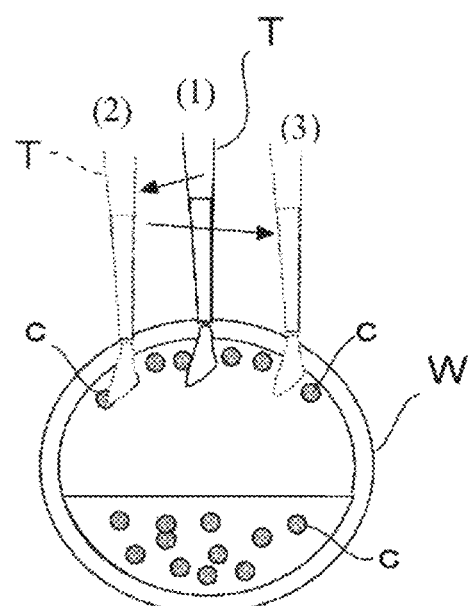

[FIG. 10]
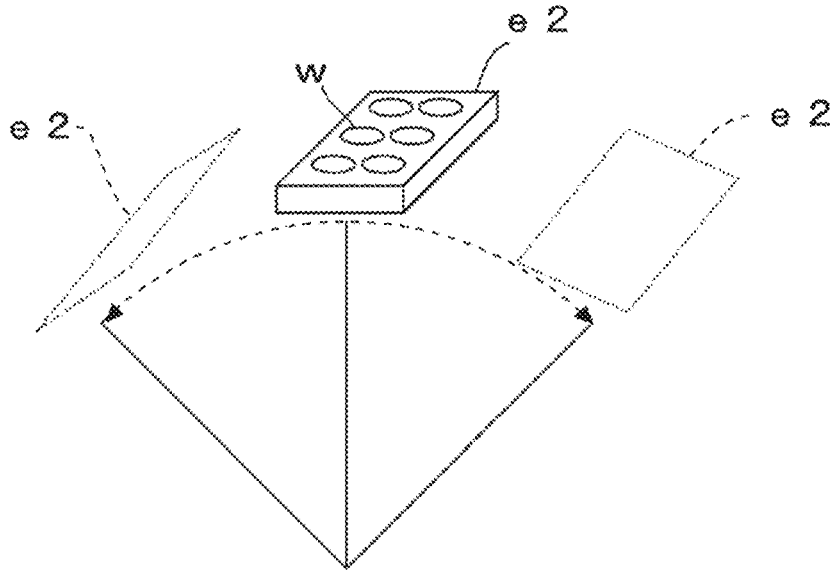
[FIG. 11]
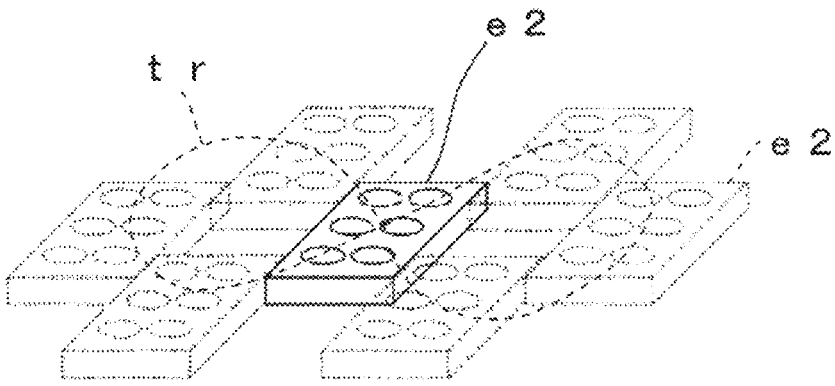

[FIG. 12]

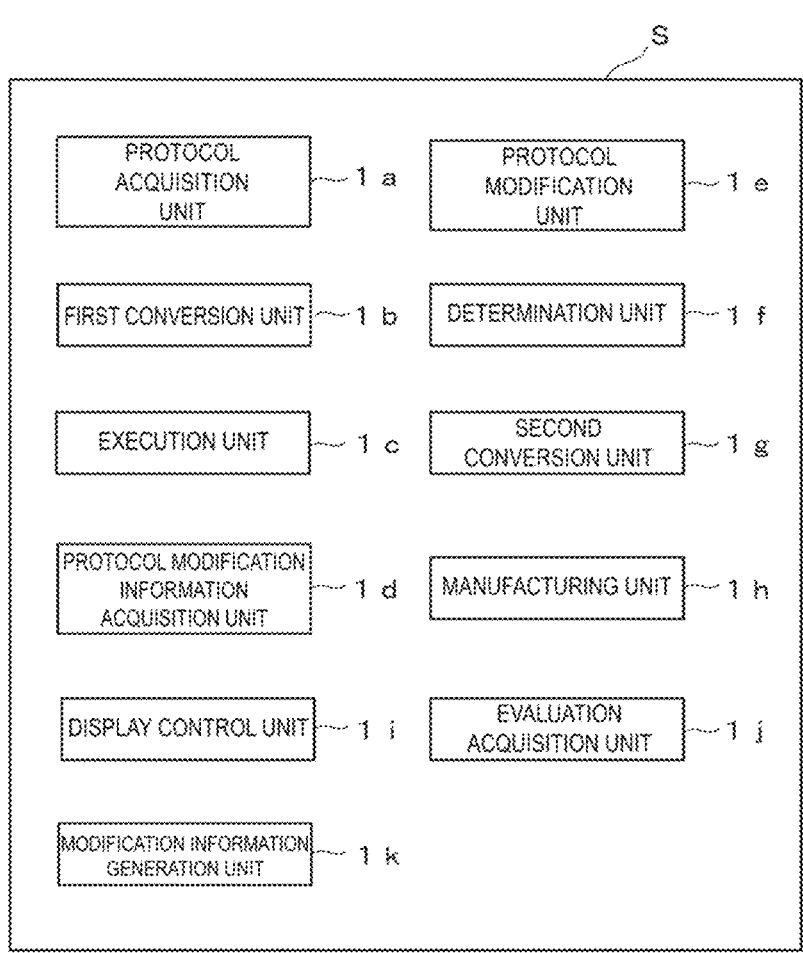

| | |
|---|---|
| PROTOCOL ACQUISITION UNIT ～ 1 a | PROTOCOL MODIFICATION UNIT ～ 1 e |
| FIRST CONVERSION UNIT ～ 1 b | DETERMINATION UNIT ～ 1 f |
| EXECUTION UNIT ～ 1 c | SECOND CONVERSION UNIT ～ 1 g |
| PROTOCOL MODIFICATION INFORMATION ACQUISITION UNIT ～ 1 d | MANUFACTURING UNIT ～ 1 h |
| DISPLAY CONTROL UNIT ～ 1 i | EVALUATION ACQUISITION UNIT ～ 1 j |
| MODIFICATION INFORMATION GENERATION UNIT ～ 1 k | |

[FIG. 13A]

SHIPMENT ARRIVAL — RECEIVING INSPECTION — CELL CULTURE → INSPECTION p 1        p 2        p 3        p 4

STORAGE → DELIVERY INSPECTION → SHIPMENT p 5        p 6        p 7

[FIG. 13B]
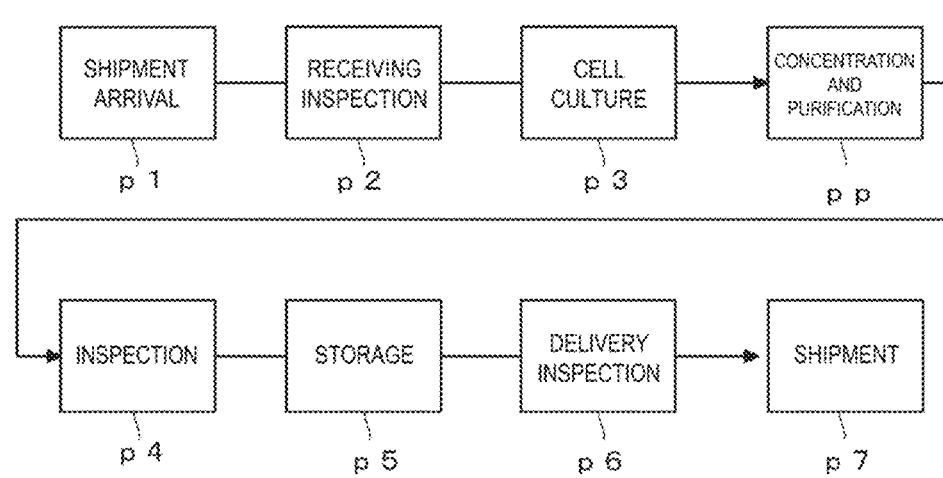

[FIG. 14]
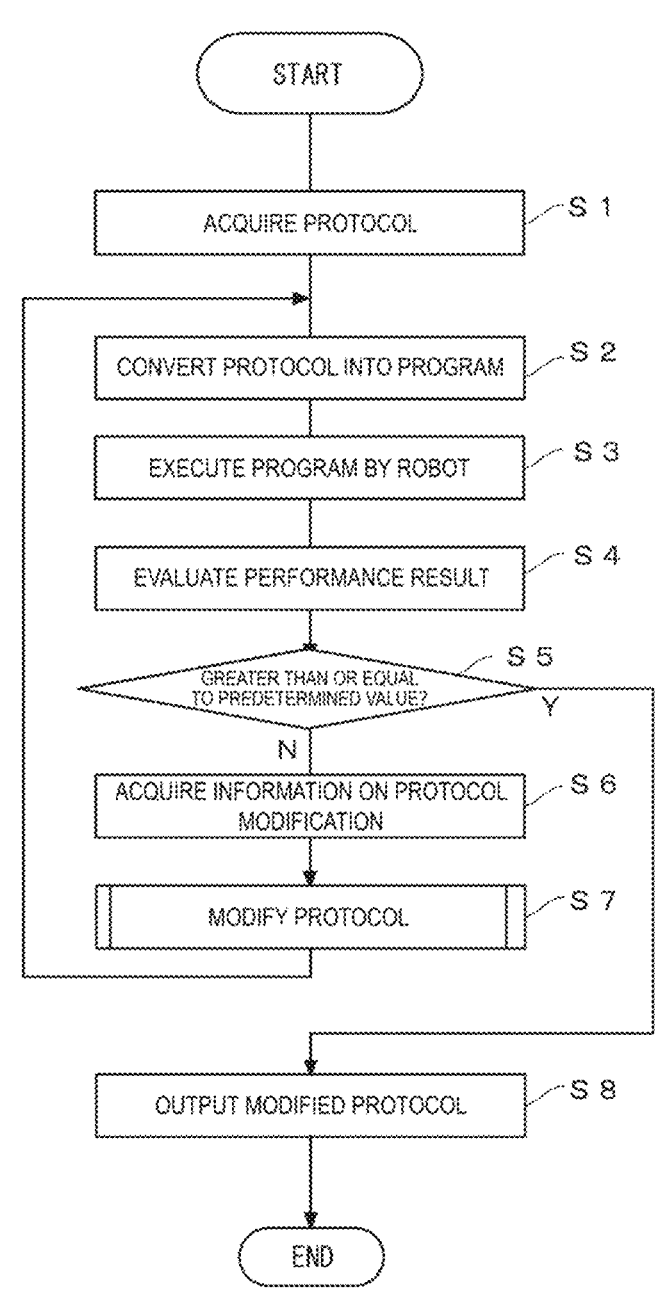

[FIG. 15]
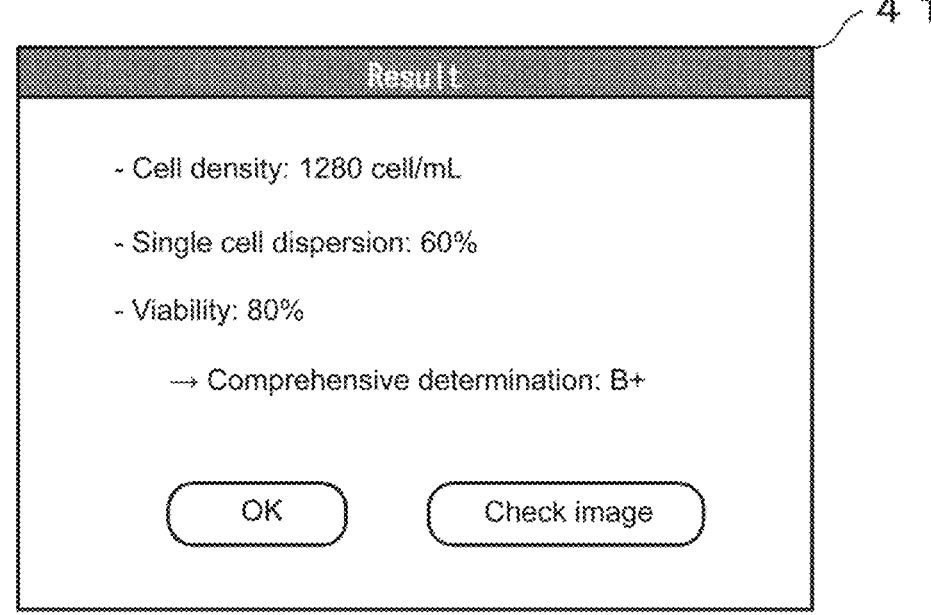

| Parameter of TRANSFER | |
|---|---|
| Dispensing amount | 100 [ μL ] |
| Tip height during aspiration | 4 [mm] |
| Aspiration speed | 5 |
| Tip height during discharge | 4 [mm] |
| Discharge speed | 5 |
| Number of pipetting operations | 4 |

OK          Cancel

[FIG. 17]
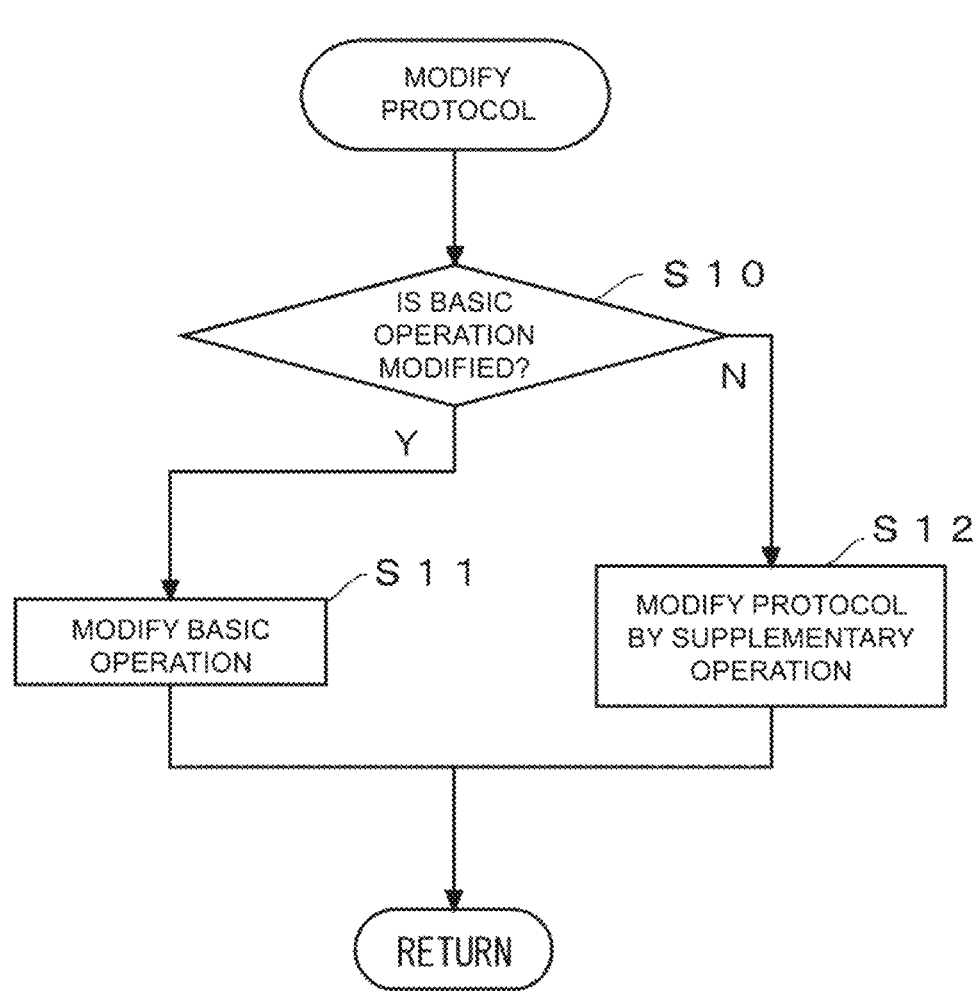

[FIG. 18]
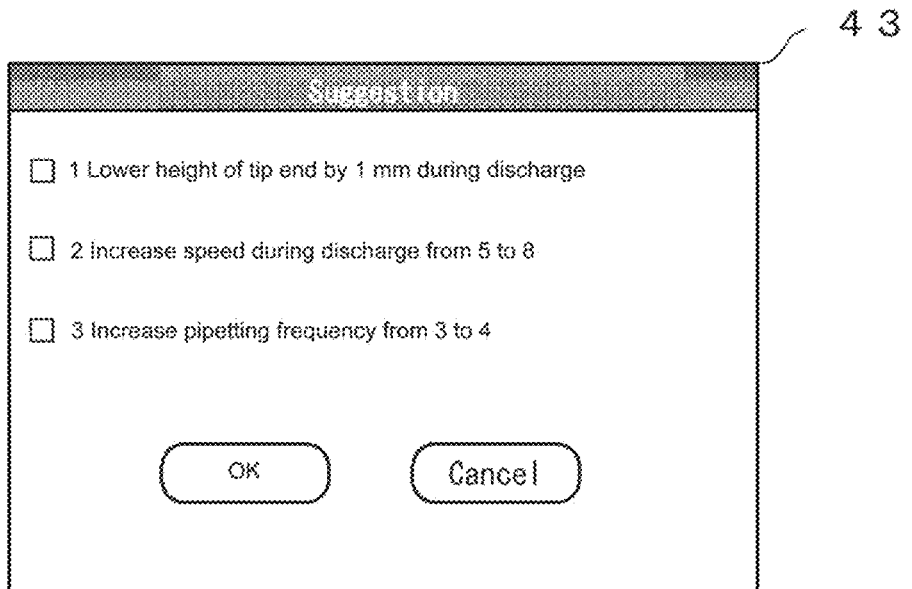
4 3
Suggestion
☐ 1 Lower height of tip end by 1 mm during discharge
☐ 2 Increase speed during discharge from 5 to 8
☐ 3 Increase pipetting frequency from 3 to 4
( OK )   ( Cancel )
[FIG. 19]
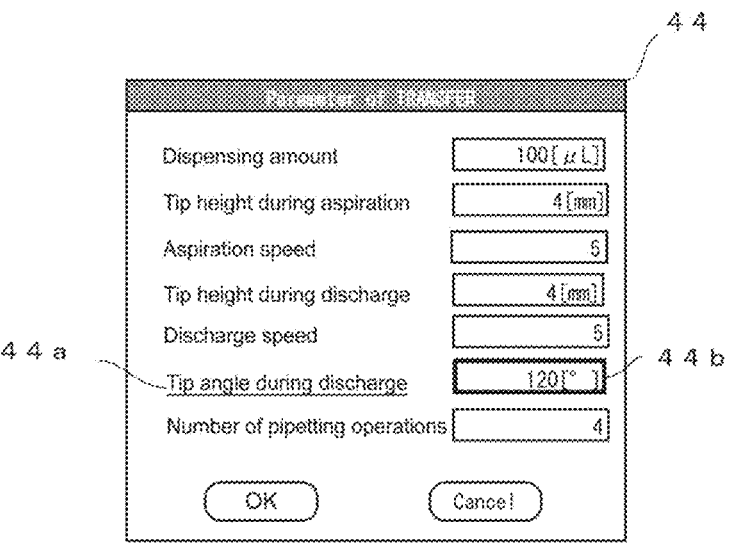
4 4
| | |
|---|---|
| Dispensing amount | 100 [μL] |
| Tip height during aspiration | 4 [mm] |
| Aspiration speed | 5 |
| Tip height during discharge | 4 [mm] |
| Discharge speed | 5 |
| Tip angle during discharge | 120 [°] |
| Number of pipetting operations | 4 |
4 4 a    4 4 b
( OK )   ( Cancel )

[FIG. 20]
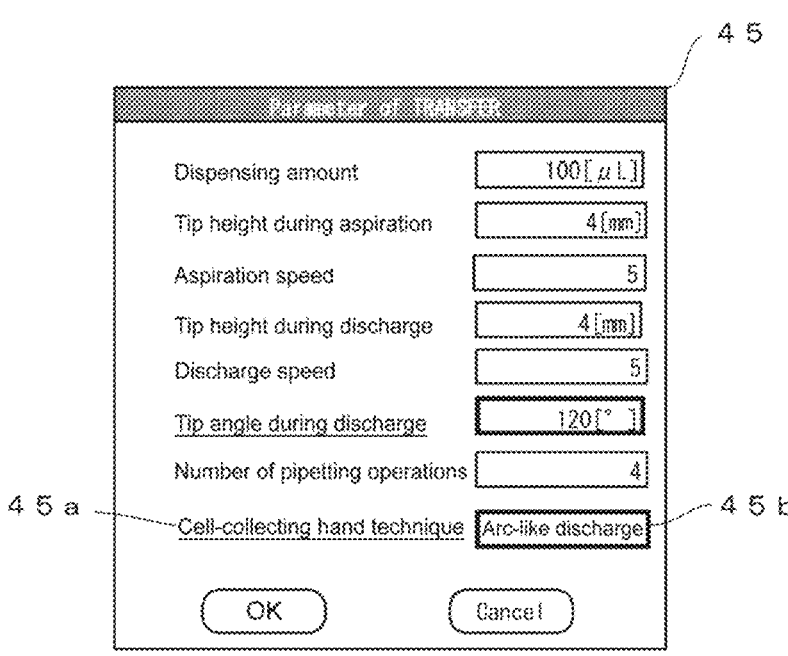

[FIG. 21]
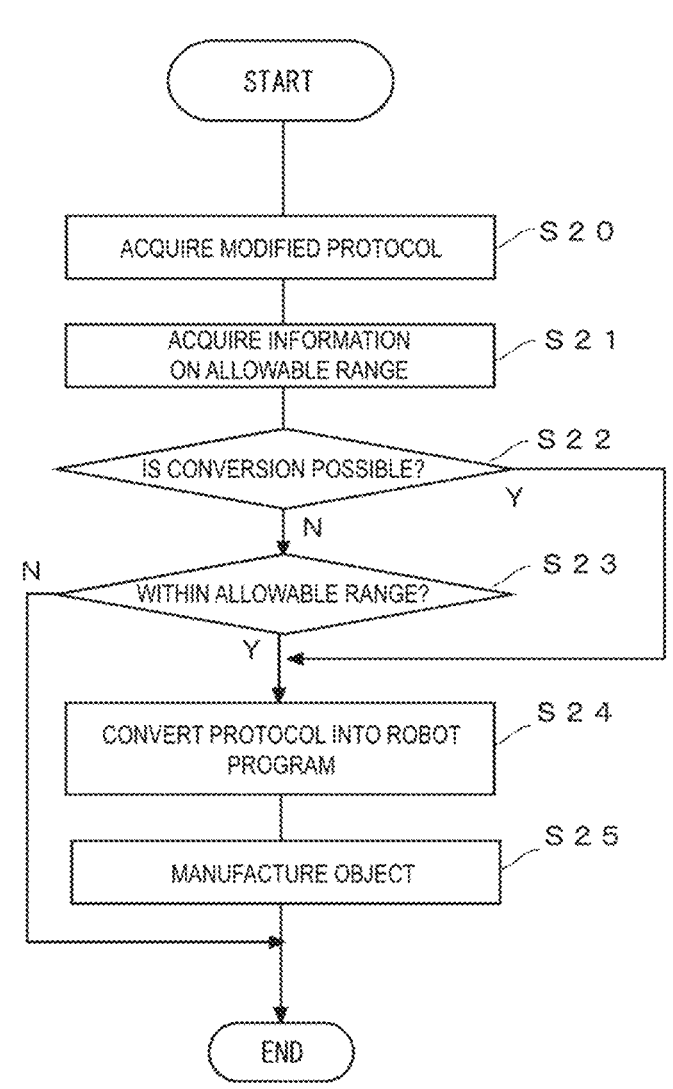

[FIG. 22]
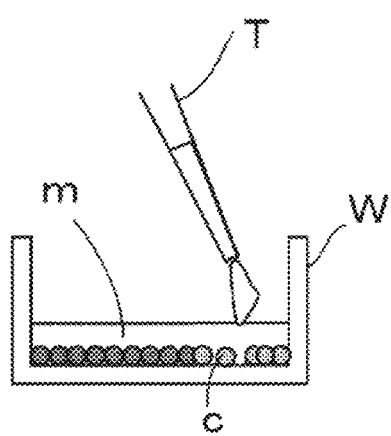
[FIG. 23A]
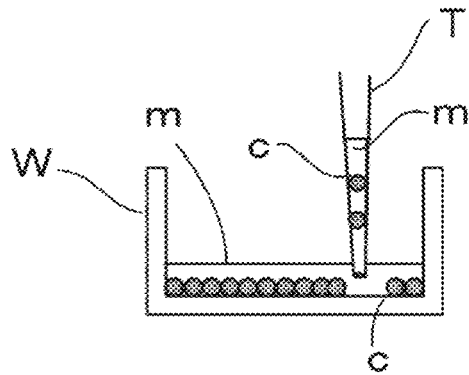

[FIG. 23B]
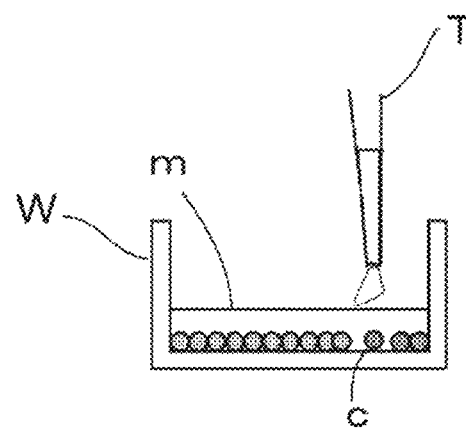

[FIG. 24A]
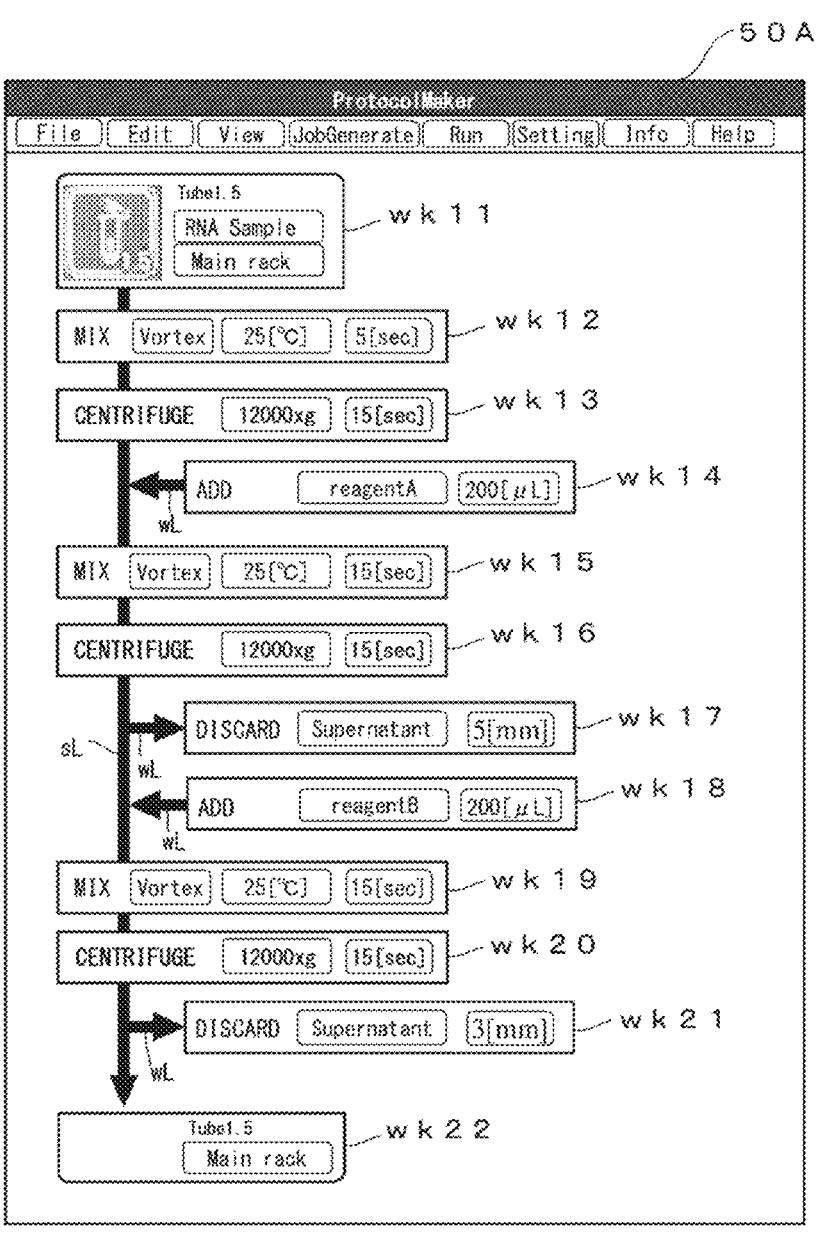

[FIG. 24B]
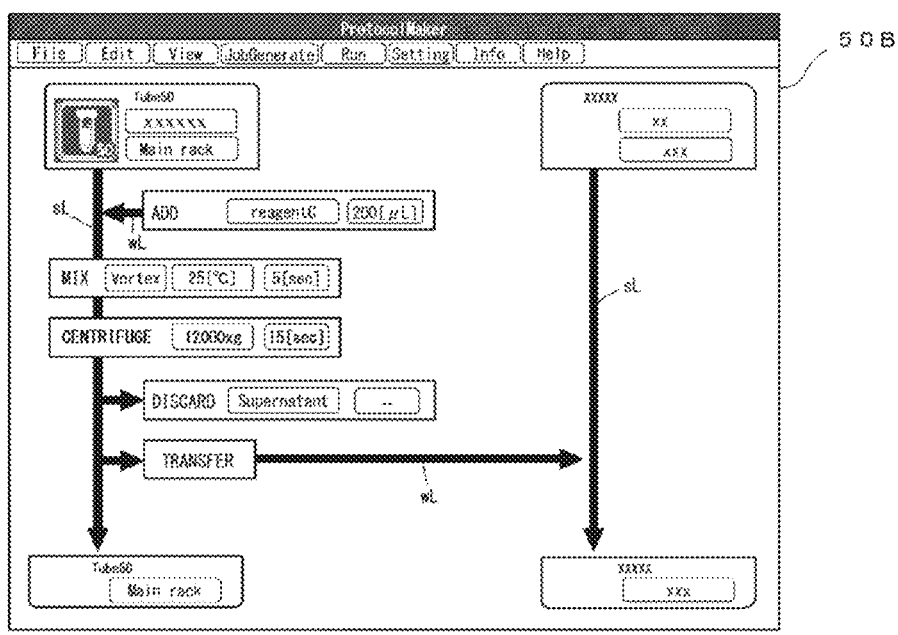
[FIG. 25A]
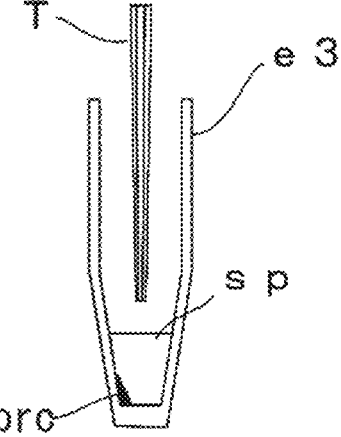

[FIG. 25B]
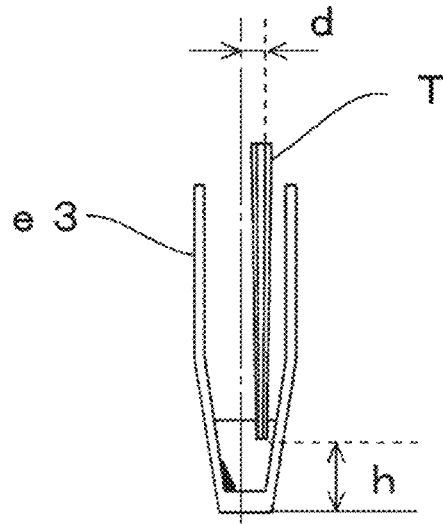
[FIG. 25C]
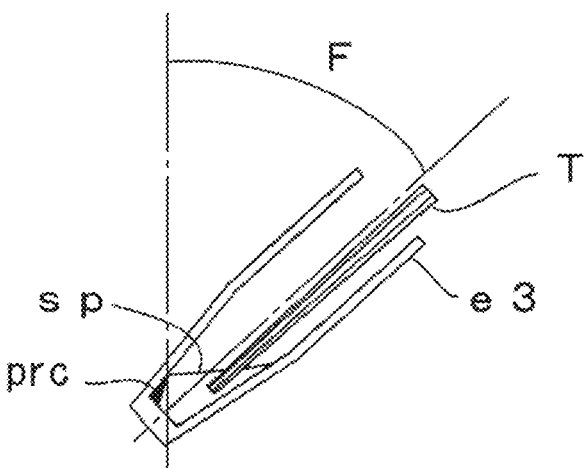

[FIG. 26]
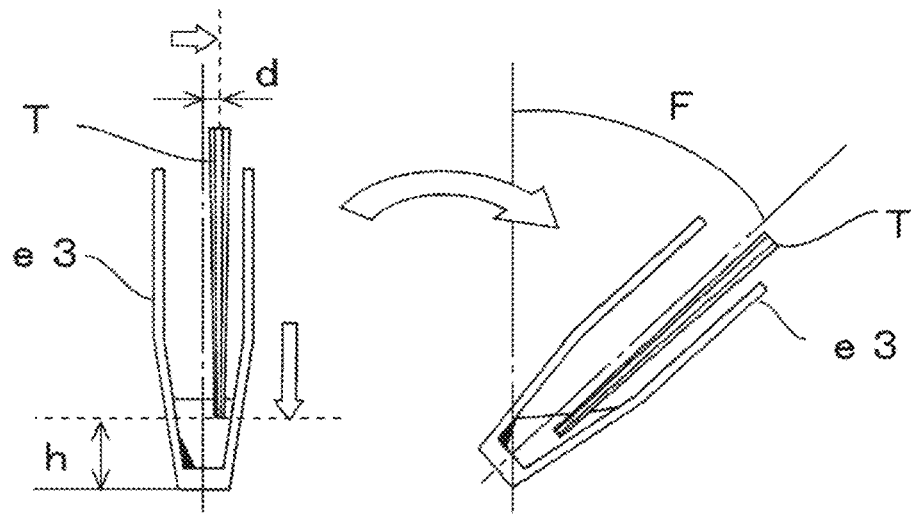
[FIG. 27]
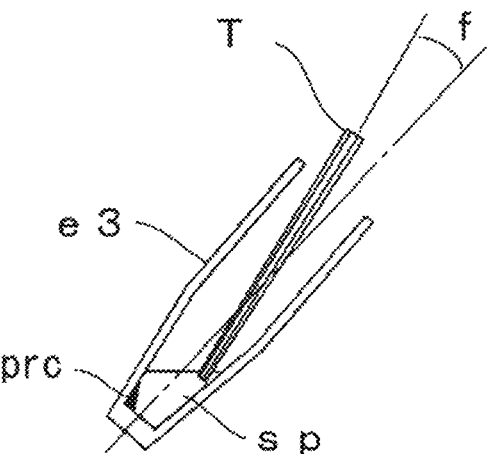

[FIG. 28A]
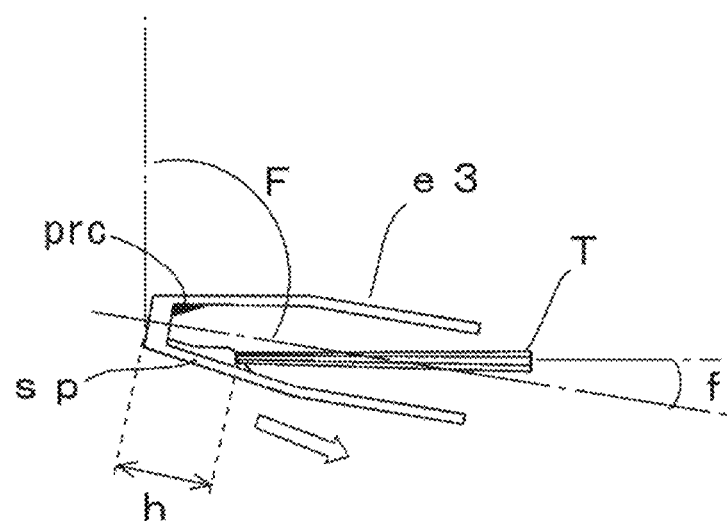
[FIG. 28B]
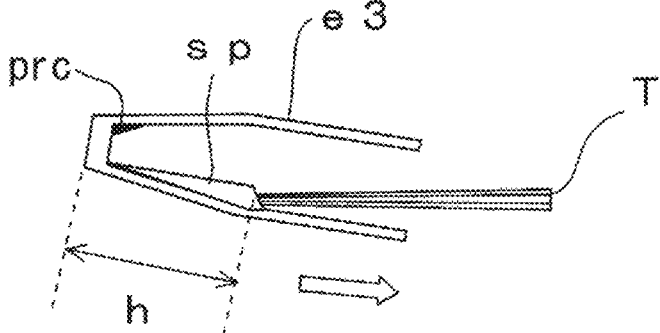

[FIG. 29]
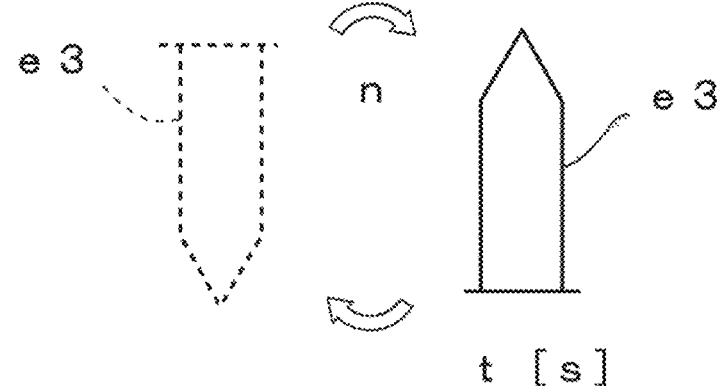
[FIG. 30]
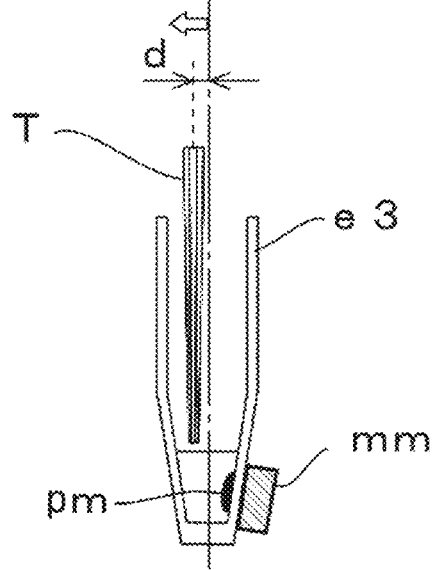

[FIG. 31]
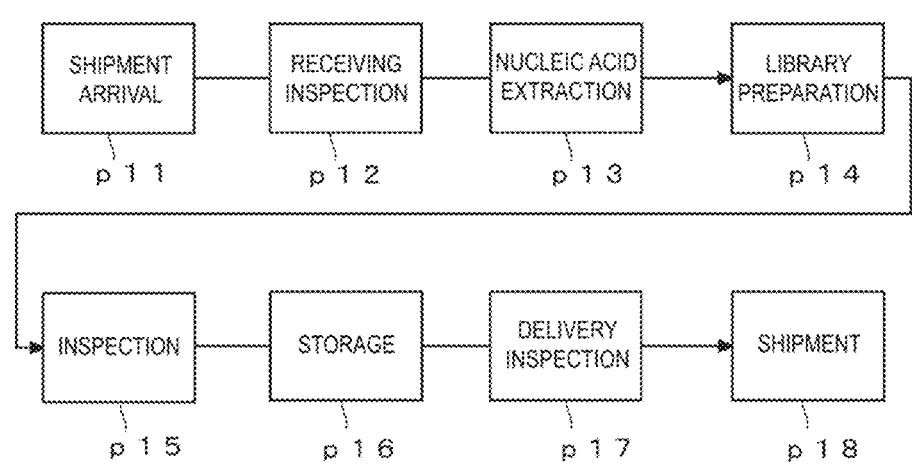
[FIG. 32]
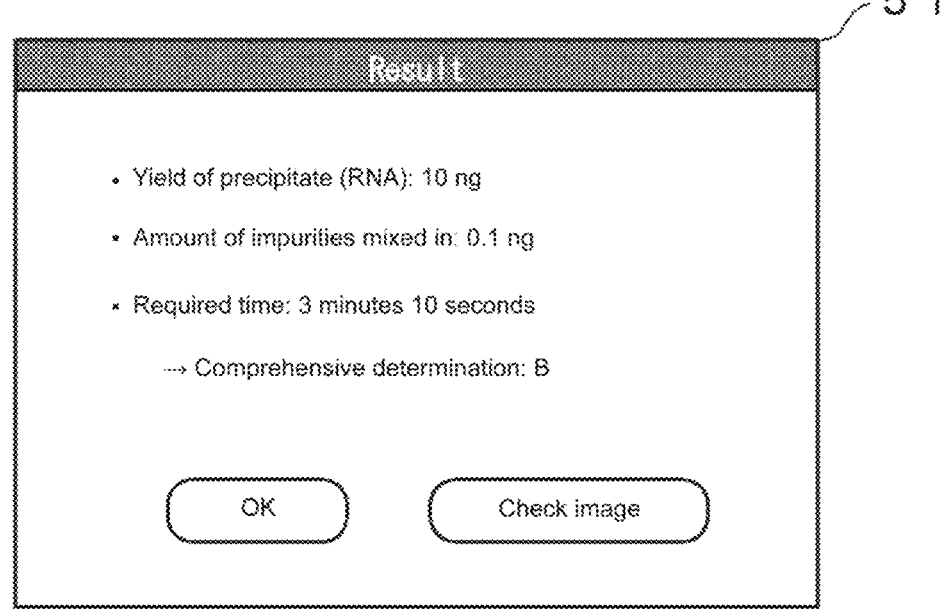

[FIG. 33]
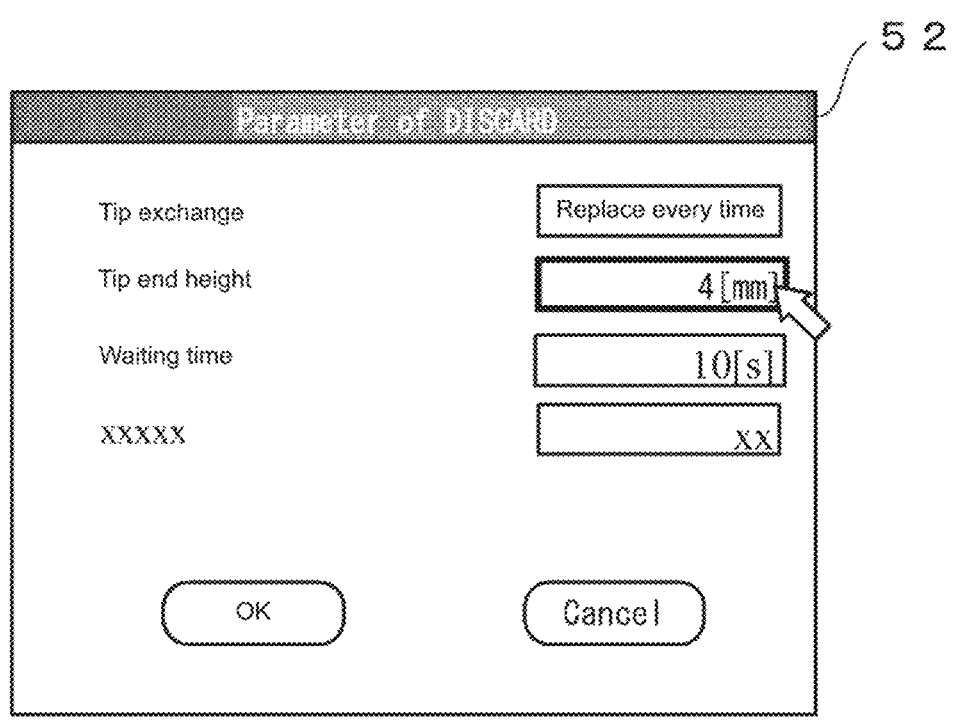

[FIG. 34]
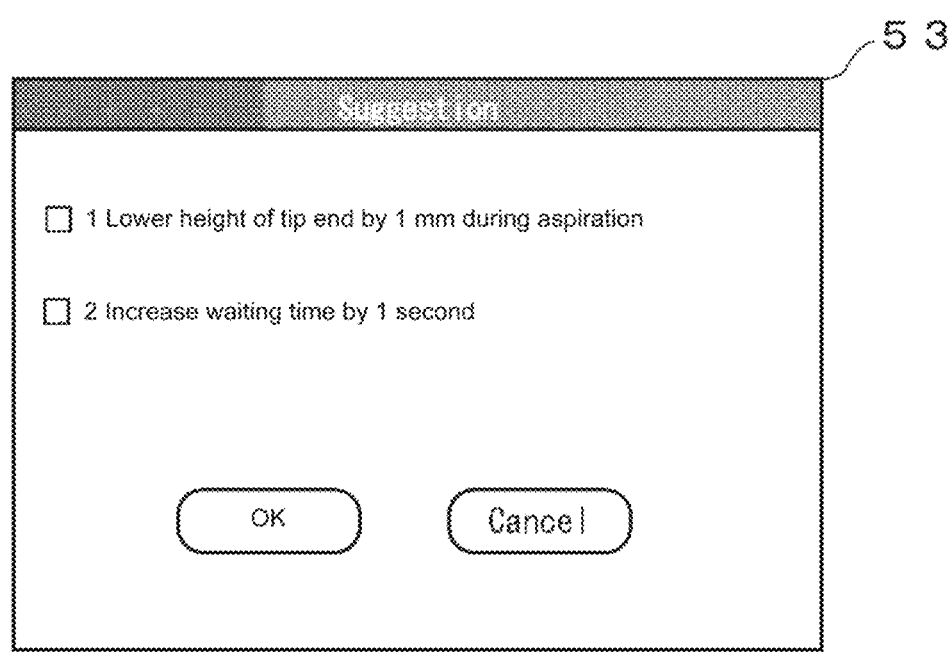
[FIG. 35]
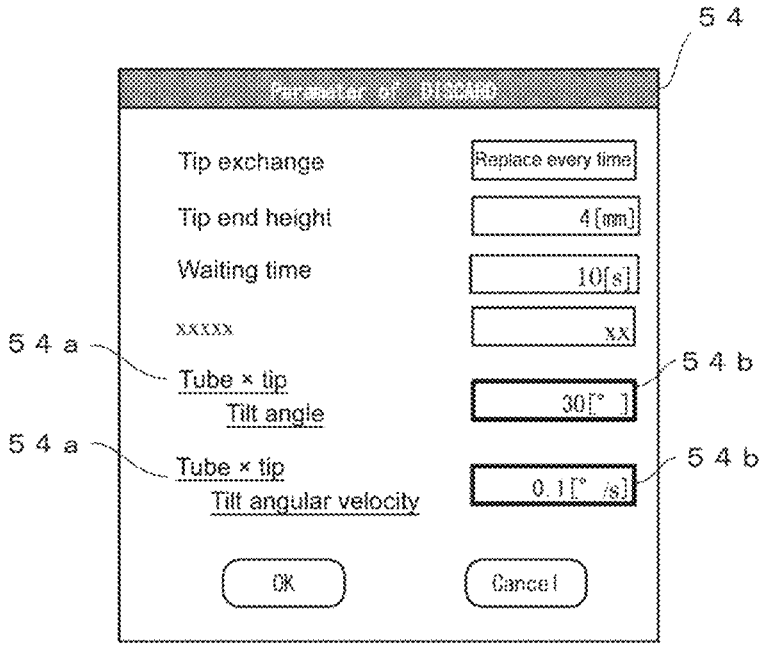

[FIG. 36]
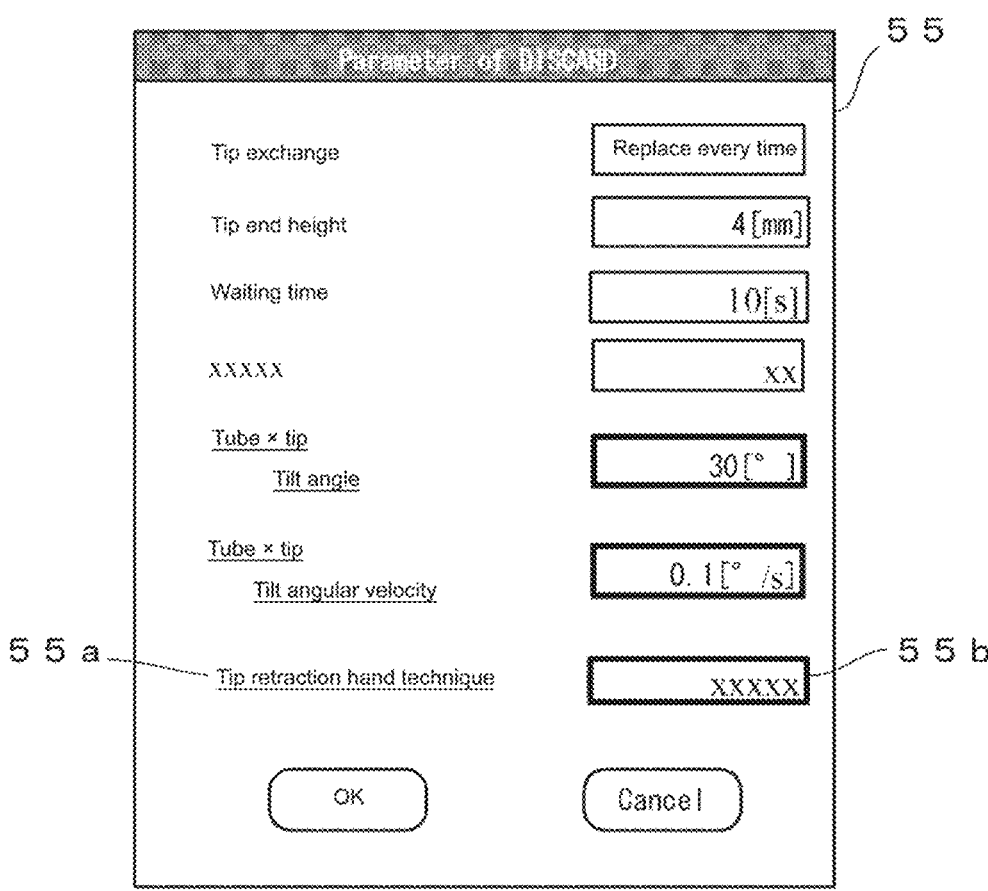

[FIG. 37]
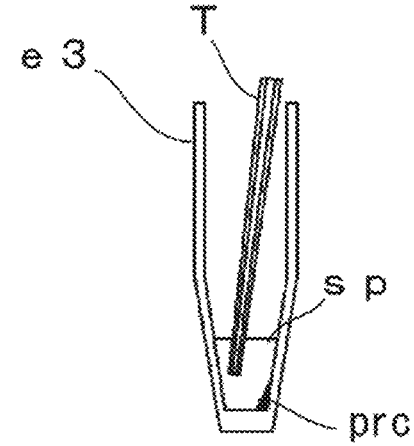

ROBOT PROGRAM GENERATION SYSTEM, ROBOT PROGRAM GENERATION METHOD, PROTOCOL CONVERSION DETERMINATION DEVICE, ROBOT PROGRAM, PROTOCOL, AND MANUFACTURING SYSTEM

TECHNICAL FIELD

The present invention relates to the technical field of a robot program generation system, a robot program generation method, a protocol conversion determination device, a robot program, a protocol, and a manufacturing system.

BACKGROUND ART

In the field of biological engineering, research and experiments are conducted according to protocols as a common procedure in order to obtain certain results. For example, Patent Document 1 discloses a neural culture system of attaching neurons to a nerve graft segment to form a test construct, culturing the test construct in culture medium, analyzing the test construct to analyze an amount of outgrowth neural tissue, and determining effectiveness of nerve grafting from metrics derived from the analysis.

SUMMARY OF INVENTION

Technical Problem

However, work with known techniques as disclosed in Patent Document 1 is work in which results vary due to subtle differences in hand technique or operation. In such work, good results can only be achieved by experienced and skilled workers. Even skilled workers do not always obtain the same results. This causes a low yield rate of finished products such as cells or output and low productivity in manufacture of objects in the field of biological engineering.

An example of a problem to be solved is to increase productivity in manufacture of objects in the field of biological engineering.

Solution to Problem

To solve the above problem, an embodiment of the invention according to aspect 1 includes: a first conversion unit configured to convert a protocol representing multiple pieces of work in the field of biological engineering into a first program executable by a first robot; a protocol modification information acquisition unit configured to acquire, to modify the protocol after the first robot performs the multiple pieces of work according to the first program, modification information for at least one of a basic operation that is basic for performing the pieces of work and is for an instrument used by the first robot for the pieces of work or a supplementary operation that supplements the basic operation; a protocol modification unit configured to modify the protocol according to the modification information acquired; and a second conversion unit configured to convert the protocol modified into a second program executable by a second robot different from the first robot.

An embodiment of the invention according to aspect 13 includes a protocol acquisition unit configured to acquire a protocol representing multiple pieces of work in a field of biological engineering and a determination unit configured to determine whether the protocol acquired can be converted into a robot program executable by a robot in accordance with the protocol acquired.

An embodiment of the invention according to aspect 18 includes: a first conversion unit configured to convert a protocol representing multiple pieces of work in a field of biological engineering into a first program executable by a first robot; a protocol modification information acquisition unit configured to acquire, to modify the protocol after the first robot performs the multiple pieces of work according to the first program, modification information for at least one of a basic operation that is basic for performing the pieces of work and is for an instrument used by the first robot for the pieces of work or a supplementary operation that supplements the basic operation; a protocol modification unit configured to modify the protocol according to the modification information acquired; and a second conversion unit configured to convert the protocol modified into a second program executable by a second robot different from the first robot. The second robot manufactures an object in the field of biological engineering according to the second program.

Advantageous Effects of Invention

According to the present invention, the robot operates with a protocol modified by modification information for at least one of a basic operation or a supplementary operation to perform more efficient work and manufacture objects in the field of biological engineering, allowing stable and high-yield cell culture and the like to be performed and productivity in manufacture of objects to be increased.

BRIEF DESCRIPTION OF DRAWINGS

FIG. 1 is a schematic diagram illustrating an example of an outline configuration of a robot program generation system according to a first embodiment of the present invention.

FIG. 2 is a schematic diagram illustrating an example of an outline configuration of a protocol generation system according to the first embodiment.

FIG. 3 is a block diagram illustrating a physical configuration of a robot controller in FIG. 2.

FIG. 4 is a block diagram illustrating a physical configuration of a higher-level controller in FIG. 2.

FIG. 5 is a schematic diagram illustrating an example of a protocol chart in the first embodiment.

FIG. 6A is a schematic diagram illustrating an example of operation on instruments.

FIG. 6B is a schematic diagram illustrating an example of operation on instruments.

FIG. 6C is a schematic diagram illustrating an example of operation on instruments.

FIG. 6D is a schematic diagram illustrating an example of operation on instruments.

FIG. 6E is a schematic diagram illustrating an example of operation on instruments.

FIG. 7 is a schematic diagram illustrating an example of parameters for a basic operation on instruments.

FIG. 8 is a schematic diagram illustrating an example of operation on instruments.

FIG. 9A is a schematic diagram illustrating an example of operation on instruments.

FIG. 9B is a schematic diagram illustrating an example of operation on instruments.

FIG. 10 is a schematic diagram illustrating an example of operation on instruments.

FIG. 11 is a schematic diagram illustrating an example of operation on instruments.

FIG. 12 is a block diagram illustrating an example of a functional configuration of the robot program generation system according to the embodiment.

FIG. 13A is a block diagram illustrating an example of a cell manufacturing process according to the embodiment.

FIG. 13B is a block diagram illustrating an example of a cell manufacturing process according to the embodiment.

FIG. 14 is a flowchart illustrating an operation example of generating a modified protocol.

FIG. 15 is a schematic diagram illustrating an example of a screen.

FIG. 16 is a schematic diagram illustrating an example of a screen.

FIG. 17 is a flowchart illustrating a subroutine for modifying a protocol.

FIG. 18 is a schematic diagram illustrating an example of a screen.

FIG. 19 is a schematic diagram illustrating an example of a screen.

FIG. 20 is a schematic diagram illustrating an example of a screen.

FIG. 21 is a flowchart illustrating an operation example of manufacturing an object.

FIG. 22 is a schematic diagram illustrating an example of operation on instruments.

FIG. 23A is a schematic diagram illustrating an example of operation on instruments.

FIG. 23B is a schematic diagram illustrating an example of operation on instruments.

FIG. 24A is a schematic diagram illustrating an example of a protocol chart in a second embodiment.

FIG. 24B is a schematic diagram illustrating an example of a protocol chart in the second embodiment.

FIG. 25A is a schematic diagram illustrating an example of operation on instruments.

FIG. 25B is a schematic diagram illustrating an example of operation on instruments.

FIG. 25C is a schematic diagram illustrating an example of operation on instruments.

FIG. 26 is a schematic diagram illustrating an example of parameters for a basic operation on instruments.

FIG. 27 is a schematic diagram illustrating an example of operation on instruments.

FIG. 28A is a schematic diagram illustrating an example of operation on instruments.

FIG. 28B is a schematic diagram illustrating an example of operation on instruments.

FIG. 29 is a schematic diagram illustrating an example of operation on instruments.

FIG. 30 is a schematic diagram illustrating an example of operation on instruments.

FIG. 31 is a block diagram illustrating an example of a manufacturing process for a processed product.

FIG. 32 is a schematic diagram illustrating an example of a screen.

FIG. 33 is a schematic diagram illustrating an example of a screen.

FIG. 34 is a schematic diagram illustrating an example of a screen.

FIG. 35 is a schematic diagram illustrating an example of a screen.

FIG. 36 is a schematic diagram illustrating an example of a screen.

FIG. 37 is a schematic diagram illustrating an example of operation on instruments.

DESCRIPTION OF EMBODIMENTS

Embodiments of the present invention will be described below with reference to the accompanying drawings. The embodiments described below are embodiments in which the present invention is applied to a robot program generation system.

First Embodiment

1. Outline of Configuration and Function of Robot Program Generation System

1.1 Configuration and Function of Robot Program Generation System

Figures 1, 2:
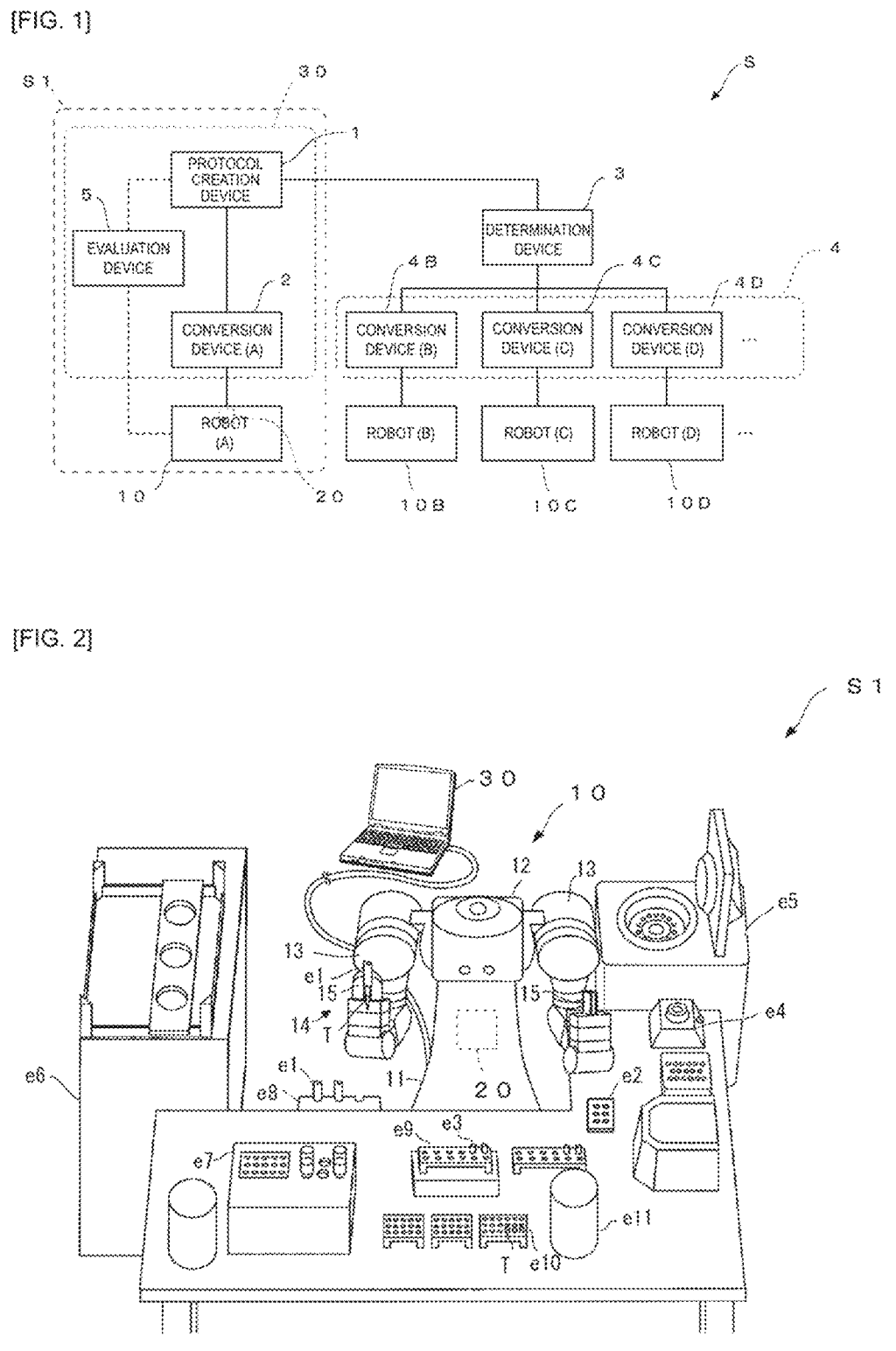

First, a configuration of a robot program generation system S according to the present embodiment will be described with reference to FIG. 1. FIG. 1 is a diagram illustrating an example of an outline configuration of the robot program generation system S according to the present embodiment.

As illustrated in FIG. 1, the robot program generation system S includes a protocol creation device 1 that modifies and generates a protocol representing multiple pieces of work in the field of biological engineering, a conversion device 2 that converts the protocol into a robot program for a robot 10, a determination device 3 that determines whether the protocol can be converted into a robot program that can be executed by a robot 10B, 10C, 10D, or the like different from the robot 10, and a conversion device 4 that converts the protocol into the robot program that can be executed by the robot 10B, 10C, 10D, or the like.

The protocol creation device 1 creates a protocol chart that describes a series of pieces of work for a work object or modifies the protocol. The protocol creation device 1 may receive editing or modification of the protocol after the protocol chart is displayed.

The conversion device 2, which is an example of a first conversion unit, converts the protocol output from the protocol creation device 1 into a robot program executable by the robot 10, and outputs the robot program to the robot 10. The robot program for the robot 10 is an example of a first program executable by a first robot.

The determination device 3, which is an example of a protocol conversion determination device, determines whether a modified protocol for the robot 10 that is closer to the optimum can be converted into a robot program executable by another robot 10B, 10C, 10D, or the like.

The conversion device 4, which is an example of a second conversion unit, converts the protocol output from the protocol creation device 1 into a robot program executable by the robot 10B, 10C, 10D, or the like. The conversion device 4 may include a conversion device 4B that converts into a robot program for the robot 10B, a conversion device 4C that converts into a robot program for the robot 10C, a conversion device 4D that converts into a robot program for the robot 10D, and the like. The robot programs for the robots 10B, 10C, and 10D are examples of a second program executable by a second robot.

The robot 10 as an example of the first robot is a robot that can reproduce work by an experienced skilled worker as much as possible and is, for example, a dual-arm seven-axis robot.

The robot 10B as an example of the second robot is a robot with slightly more restricted motions than the robot 10 and is, for example, a dual-arm six-axis robot. The robot 10C as an example of the second robot is a robot with more restricted motions than the robot 10B and is, for example, a single-arm six-axis robot. The robot 10D as an example of the second robot is a robot with more restricted motions than the robot 10C and is, for example, a Cartesian coordinate robot. The robot 10B, the robot 10C, and the robot 10D are examples of the second robot. Each robot may be assigned a robot ID for identifying the robot itself or a type of robot.

The robots 10, 10B, 10C, 10D, and the like manufacture objects such as cells or processed products in the field of biological engineering according to protocols. The robots 10, 10B, 10C, 10D, and the like may be located in the same factory or may be located in different factories.

An evaluation device 5 compares information on evaluation of work by the robot 10 with evaluation criteria and outputs comparison results to the protocol creation device 1.

The protocol creation device 1 may have a function of the determination device 3. A protocol may be provided from the protocol creation device 1 to the determination device 3 through a network line or a recording medium such as a compact disc read only memory (CD-ROM). Each of the conversion devices 4B, 4C, and 4D may have the function of the determination device 3. A robot program may be provided to each of the robots 10B, 10C, and 10D through a network line or through a recording medium such as a CD-ROM.

Here, in the field of biological engineering, a protocol is a procedure for work performed on a work object such as a specimen or a sample or an object to be processed for a purpose of inspection, culture, pretreatment, extraction, or the like. A protocol is composed of one or more pieces of work.

Examples of biological engineering include biochemistry, biotechnology, bioengineering, and biotechnology. Biological engineering may include technologies related to life science, biophysics, cell biology, and molecular biology.

Examples of cells to be cultured include primary cells and cell lines. To be more specific, examples of cells to be cultured include undifferentiated cells such as stem cells, and differentiated nerve cells, muscle cells, pancreatic cells, epithelial cells, bone and bone marrow cells, and blood cells. Examples of cells to be cultured also include cancer cells and tumor cells. Examples of cells to be cultured also include genome-edited cells and artificial cells, and transgenic cells and artificial cells. Examples of a method for culturing cells include planar culture, suspension culture, organoid culture, which is three-dimensional culture, and mixed culture.

Examples of specimens to be processed in the field of biological engineering include specimens such as blood, urine, saliva, stool, cells, and tissues. Examples of objects to be processed in the field of biological engineering include intermediate processed products produced in a series of processes. Examples of intermediate processed products include cell components such as nucleic acids, proteins, and metabolites. The processed products are finally produced materials themselves, such as nucleic acids, proteins, metabolites, or the like processed through a series of pieces of work, or materials obtained by concentrating, amplifying, and fragmenting or chemical modifying the above materials. The processed products are used for inspection, analysis, manufacture of specific substances, or the like.

In the case of genomics, which is an example of omics, examples of the process include a process of extracting deoxyribonucleic acid (DNA), ribonucleic acid (RNA), or the like from blood, urine, saliva, stool, cells, tissues, or the like, a process of fragmenting DNA, RNA, or the like, a process of amplifying DNA, RNA, or the like, and a process of purifying DNA, RNA, or the like. Examples of processed products include DNA libraries synthesized by fragmenting, end-modifying, and amplifying DNA or the like and extracted and concentrated RNA. The processed products are used for cancer genome diagnosis, determination of risk of developing various lifestyle-related diseases, diagnosis of familial genetic diseases, diagnosis of epidemic infectious diseases such as viruses, or the like.

In the case of proteomics, which is an example of omics, examples of the process include extraction and purification, concentration, fragmentation, and chemical modification of a comprehensive or specific protein group from blood, urine, saliva, stool, cells, tissues, or the like. Examples of processed products include separated proteins, peptides, and chemically modified products thereof. The processed products serve as indicators of expression levels or activities of specific proteins, and by analyzing and quantifying the specific proteins, the processed products are used for diagnosis of diseases, quality control of regenerative medicine products or cell preparations, or the like.

In the case of metabolomics, which is an example of omics, examples of the process include a process of extracting metabolites from blood, urine, saliva, stool, cells, tissues, or the like, a process of concentrating and purifying metabolites by removing impurities, and a process of removing impurities. Examples of metabolites include sugars, organic substances, amino acids, and lipids. Metabolites, which are processed products, are analyzed and quantified by mass spectrometry or the like, and used for diagnosis of diseases, quality control of regenerative medicine products or cell preparations, or the like.

1.2 Configurations and Functions of Protocol Generation System and Robot

Next, configurations of a protocol generation system S1 and the robot according to the present embodiment will be described with reference to FIG. 2. FIG. 2 is a diagram illustrating an example of an outline configuration of the protocol generation system S1 according to the present embodiment.

As illustrated in FIG. 2, the protocol generation system S1 includes the robot 10 that performs multiple pieces of work in the field of biological engineering according to a protocol, a robot controller 20 that controls the robot 10, and a higher-level controller 30 that transmits information on motion commands for the robot 10 to the robot controller 20. As illustrated in FIG. 1, the higher-level controller 30 achieves the functions of the protocol creation device 1, the conversion device 2, and the evaluation device 5.

As illustrated in FIG. 2, the robot 10 is, for example, a dual-arm multi-axis robot. The robot 10 includes a body 11 that stands up against a floor, a shoulder 12 attached to an upper portion of the body 11, two arms 13 respectively attached to both end portions of the shoulder 12, and hands 14 that are end effectors at end portions of the arms 13. The robots 10B, 10C, 10D, and the like other than the robot 10 may include some of these parts.

The body 11 includes a servomotor that rotates the shoulder 12 around a vertical axis. The body 11 may or may not accommodate the robot controller 20.

The shoulder 12 is rotatable around the vertical axis by the servomotor of the body 11.

The arm 13 is, for example, a serial link articulated arm. The arm 13 includes servomotors at all joint portions.

The hand 14 is, for example, a robot hand including multiple fingers 15. The hand 14 grasps various instruments and the like by opening and closing the fingers 15 with a servomotor.

The hand 14 may include a position measurement sensor such as a laser sensor. The hand 14 may include a camera that photographs a shape or the like of an object to be grasped. Instead of the laser sensor, the hand 14 may include an ultrasonic sensor, a contact sensor, a magnetic sensor, an imaging sensor, or the like as a sensor for measuring a distance to an object. The hand 14 may include a microscope for observing the contents or the like of the instrument grasped by the hand 14. Examples of the camera include digital cameras including a charge coupled device (CCD) image sensor, a complementary metal oxide semiconductor (CMOS) image sensor, or the like. The camera shoots videos, still images, or the like. The robot 10 may take an image while the hand 14 grasps a fiberscope.

The hand 14 may include various sensors capable of performing various measurements. Examples of the various sensors include a temperature sensor, a humidity sensor, a concentration sensor that measures pH or a concentration of a specific ion or a substance, and an optical sensor. The optical sensor may be a combination of a light emitting element that emits light of a certain wavelength and a light receiving element that receives transmitted light or reflected light.

The robot 10 is not limited to a dual-arm robot and may be any robot capable of performing a series of pieces of work in cell culture or the like. However, it is easier to generate a modified protocol that is closer to the optimum for the dual-arm multi-axis robot such as a dual-arm seven-axis robot than for a single-arm robot, a Cartesian coordinate robot, or the like. The fingers 15 may be articulated fingers.

Here, an instrument used by the robot 10 may be any instrument that can be operated by the hand 14 of the robot 10. For example, as illustrated in FIG. 2, examples of the instrument used by the robot 10 include a dispenser e1, a microplate e2, which is an example of a container, a microtube e3, which is an example of a container, and an aspirator. The robots 10B, 10C, 10D, and the like other than the robot 10 may use these instruments.

Examples of the dispenser e1 include an electric pipette and an electric syringe that automatically aspirate and discharge liquid in response to a specific signal or a specific operation. The dispenser e1 does not need to be electrically powered, and may be, for example, a manually operated syringe or pipette. The dispenser e1 includes a body and a tip T that is detachable from the body.

The microplate e2 is, for example, a resin plate with multiple wells that are bottomed holes.

The microtube e3 is, for example, a small test tube made of resin such as polypropylene. The microtubes e3 may be connected microtubes in which multiple microtubes e3 are connected. Each microtube in the connected microtubes may be used as a well.

The hand 14 of the robot 10 causes liquid from the dispenser e1 to be discharged to the microplate e2 or the microtube e3 or causes liquid from the microplate e2 or the microtube e3 to be aspirated to the dispenser e1. In the case of the dual-arm robot, one hand 14 grasps the microplate e2 or the microtube e3, and liquid is discharged from or aspirated to the dispenser e1 grasped by the other hand 14.

Examples of devices used by the robot 10 include peripheral devices such as a mixer e4, a centrifuge e5, an incubator e6, and a thermostatic bath e7 as illustrated in FIG. 2.

Examples of the mixer e4 include a vortex mixer that agitates the contents of the microtube e3 or the like by swirling a bottom thereof, and a microplate mixer that agitates the contents of the well of the microplate e2. The microtube e3 or the microplate e2 is placed on the mixer e4 by the hand 14 of the robot 10 and is agitated.

In the centrifuge e5, the microtube e3 or the like is set and accelerated by high-speed rotation to separate the contents of the microtube e3. The hand 14 of the robot 10 opens a lid of the centrifuge e5, sets the microtube e3, closes the lid, and turns on a switch. After centrifugation, the hand 14 of the robot 10 opens the lid of the centrifuge e5 and takes out the microtube e3.

The incubator e6 is, for example, a carbon dioxide incubator. The incubator e6 controls temperature, humidity, and $CO_2$ concentration. The incubator e6 stores the microplate e2.

The thermostatic bath e7 is, for example, an aluminum block thermostatic bath. The microtube e3 is accommodated in an aluminum block of the thermostatic bath e7 cooled by a Peltier element or heated by a heater.

The hand 14 of the robot 10 opens and closes doors and operates switches of these devices such as the incubator e6. The hand 14 of the robot 10 places instruments such as the microplate e2 and the microtube e3 in these devices such as the incubator e6.

In addition, as illustrated in FIG. 2, a pipette rack e8 that accommodates the dispensers e1 having different volumes, a tube rack e9 stores the microtubes e3, a tip rack e10 for preparing tips T to be used in the dispenser e1, a dust box e11 for discarding used tips T, and the like are also examples of instruments used by the robot 10.

In aspirating or injecting a drug solution using the dispenser e1, the hand 14 of the robot 10 takes out the dispenser e1 from the pipette rack e8 and attaches the tip T prepared in the tip rack e10 to a tip of the dispenser e1 to perform work. The tips T are used only once as a rule, and the used tips T are discarded in the dust box e11.

Examples of instruments used by the robot 10 include containers such as a cryotube, a petri dish, a culture flask, a cell counter, and a reagent bottle containing a reagent.

Examples of instruments used by the robot 10 include tools such as a scraper, a cell spreader, and an ultrasonic homogenizer.

Examples of instruments used by the robot 10 include various measuring instruments. Examples of various measuring instruments include a spectrophotometer for concentration measurement, a component analyzer, a DNA sequencer, an electrophoresis instrument, a polymerase chain reaction (PCR) instrument, a cell counter, a mass spectrometer, and a nuclear magnetic resonance (NMR) instrument.

In the present embodiment, highly pure reagents or samples are preferably used in experiments. For instruments such as containers that come into direct contact with the work object, it is preferable to use disposable instruments or autoclaved instruments.

1.3 Configuration and Function of Robot Controller 20

Next, the robot controller 20 will be described with reference to the figure. FIG. 3 is a block diagram illustrating a physical configuration of the robot controller 20.

As illustrated in FIG. 3, the robot controller 20 is a computer including a driver 21, a communication unit 22, a storage unit 23, and a control unit 24.

The driver 21 is electrically or electromagnetically connected to the robot 10. The driver 21 is, for example, a servo amplifier, and acquires information on a rotational position and a speed of a rotation angle detector (encoder, resolver, etc.) of a servomotor. The driver 21 supplies power to the motors of the robot 10. The driver 21 may receive outputs from various sensors of the robot from the robot 10.

The communication unit 22 is electrically or electromagnetically connected to the higher-level controller 30. The communication unit 22 controls a state of communication with the higher-level controller 30 and the like.

For example, the communication unit 22 receives a job from the higher-level controller 30 and transmits a state of the robot 10 to the higher-level controller 30. The communication unit 22 may receive outputs from various sensors of the robot from the robot 10.

The storage unit 23 is, for example, a hard disk drive, a solid-state drive, or the like. The storage unit 23 stores various programs such as an operating system, application software for editing a protocol and the like, and a job that is a specific program to be operated by the robot 10.

The storage unit 23 includes a database of information necessary for motions of the servomotors mounted on the joint portions of the robot 10, such as parameters for conversion into a three-dimensional coordinate space, in association with jobs.

Here, "job" is a unit motion of the robot 10. Examples of the job include one or more jobs for grasping an instrument such as the dispenser e1, one or more jobs for releasing the instrument, one or more jobs for aspirating with the dispenser e1, and one or more jobs for moving the arm 13 of the robot 10 from a certain reference point to another reference point. The job is a robot program for executing the protocol and is written as a code in the robot program.

The various programs may be obtained, for example, from another server device or the like via a network, or may be recorded in a recording medium and read via a drive device. The network may be constructed with a dedicated communication line, a mobile communication network, a gateway, or the like.

The control unit 24 includes a central processing unit (CPU), a read only memory (ROM), a random access memory (RAM), and the like. The CPU of the control unit 24 reads codes of various programs stored in the ROM or the storage unit 23 and executes various pieces of work.

The control unit 24 controls the driver 21, the communication unit 22, and the storage unit 23. The control unit 24 generates a motion signal for operating the robot 10, for example, based on a job. This motion signal is generated, for example, as a pulse signal for operating the servomotor mounted on each joint portion of the robot 10. The driver 21 supplies power to the motor of the robot 10 based on the generated motion signal. The control unit 24 calculates target angles and coordinates of the joints based on, for example, inverse kinematics, forward kinematics, or the like.

The robot controller 20 causes the robot 10 to perform a desired motion based on a motion command that is a set of jobs for controlling the robot 10.

A hardware configuration of the robot controller 20 is not necessarily limited to one in which each functional module is configured by executing a program. For example, the robot controller 20 may configure functions with dedicated logic circuits or an application specific integrated circuit (ASIC) in which these logic circuits are integrated. Further, the robot controller 20 may be configured in combination with a programmable logic controller (PLC). Motions of the robot 10B, the robot 10C, and the robot 10D are also controlled by respective robot controllers. The configurations and functions of these robot controllers may be the same as those of the robot controller 20, and the detail is omitted herein.

1.4 Configuration and Function of Higher-level Controller 30

Figure 4:
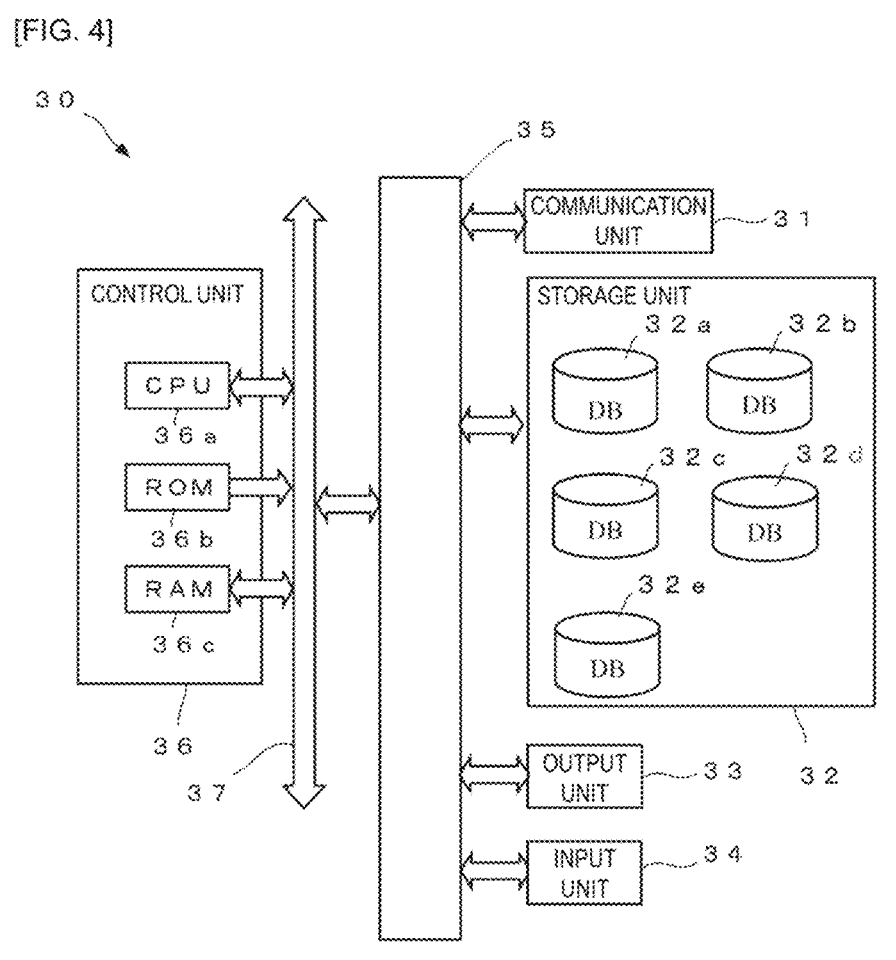

Next, the higher-level controller 30 will be described with reference to the figure. FIG. 4 is a block diagram illustrating a physical configuration of the higher-level controller 30.

As illustrated in FIG. 4, the higher-level controller 30 is a computer including a communication unit 31, a storage unit 32, an output unit 33, an input unit 34, an input/output interface unit 35, and a control unit 36. The control unit 36 and the input/output interface unit 35 are electrically connected to each other via a system bus 37.

The communication unit 31 is electrically or electromagnetically connected to the robot controller 20 to control a communication state with the robot controller 20 and the like. The communication unit 31 may be connected to an external server device through a network (not illustrated).

The storage unit 32 is, for example, a hard disk drive, a solid-state drive, or the like. The storage unit 32 stores various programs such as an operating system, various files, and the like. The various programs and the like may be obtained, for example, from an external server device or the like via a network, or may be recorded in a recording medium and read via a drive device.

In the storage unit 32, a management database 32a, a protocol database 32b, an evaluation database 32c, a history database 32d, an allowable range database 32e, and the like are constructed.

The management database 32a stores information on instruments and the like. For example, the management database 32a stores information such as names of instruments, positions of the instruments, and states of the instruments in association with instrument IDs of the instruments. When the instrument is the microplate e2, the management database 32a stores data such as a position of the microplate e2 in the incubator e6, a work object ID of a work object such as a specimen or an arrived sample that is part of a biological tissue such as cells or DNA, a culture time, a culture medium, a passage method, a passage number, and states of the contents of the respective wells W.

The management database 32a stores management data of schedules such as shipment arrival, manufacture, and shipment.

The protocol database 32b stores, in association with the protocol IDs, information such as protocol names, work objects, pieces of work to be performed, an order of the pieces of work, conditions of the respective pieces of work, instruments and reagents used in the respective pieces of work, and the respective pieces of operation included in the respective pieces of work.

The protocol database 32b stores information for converting each work of the protocol into jobs. For example, the protocol database 32b stores multiple reference points set in a space within which the robot 10 moves, classified into tree-structured hierarchies. The protocol database 32b may store information for converting each work of the protocol into jobs for the robot 10B or the like corresponding to the robot ID in association with the robot ID.

The evaluation database 32c stores evaluation criteria when a series of pieces of work in the protocol are completed, evaluation criteria for the respective pieces of work and the respective pieces of operation, and the like in association with the protocol IDs. Examples of the evaluation criteria include a required cell density, cell morphology (e.g., acinous, single cell), a cell shape, a cell viability, a cell proliferation rate, a cell differentiation rate, features such as images of living cells and dead cells, reference values for concentration, amount, and the like measured by measuring instruments and analyzers, a yield, and a yield rate. Examples of the evaluation criteria at a molecular level include an amount of gene expression, an amount of protein expression variation, an amount of metabolite variation, and an amount of glycosylation variation.

In addition, the evaluation database 32c may store determination reference values for cell counting, various template images necessary for image analysis, image features, parameters learned by artificial intelligence necessary for evaluation, and the like.

Examples of evaluation criteria or evaluation indicators for protocol execution results include a cell density, a single cell dispersion, a cell viability, and the like. The evaluation may be such that a collection rate is high when the number of cells is a predetermined number or more, or that there is little damage to the cells when a cell viability is a predetermined number or more. The evaluation may be a comprehensive evaluation combining a cell density, a single cell dispersion, a cell viability, and the like.

Examples of the evaluation criteria of the operation include "good hand technique", that is, "good operation". Examples of the "good operation" include "no bubbles", "no dripping", "evenly mixing" (dispersing), and "remaining no reagent".

The higher-level controller 30 compares and evaluates an amount measured by the measuring instrument, an amount analyzed by the analyzer, and features obtained by image processing with the evaluation criteria in the evaluation database 32c.

The history database 32d stores data such as a protocol ID of an executed protocol, the work object ID, the work object type ID, results measured by the measuring instrument, evaluation results, photographed images, an execution time in association with the execution ID.

The allowable range database 32e stores information on an allowable range in which a modified protocol can be changed when converting a protocol for the robot 10 into a robot program for the other robot 10B or the like.

The allowable range database 32e stores specifications indicating performances of the robots such as the number of arms and the number of joints of the respective robots in association with the robot IDs. By comparing information on specifications of the robot, it is determined whether the modified protocol can be converted into the second program. The information on specifications of the robot may include information on usable devices around the robot.

The allowable range database 32e stores values corresponding to the evaluation criteria in association with the robot ID, the object ID of the object to be manufactured, and the like. When the evaluation criterion is a percentage viability (Viability) of viable cells in a population of cells that are an example of the objects to be manufactured, as a value corresponding to the evaluation criterion, for example, the percentage viability is Viability of 95% for the dual-arm seven-axis robot 10, Viability of 90% for the dual-arm six-axis robot 10B, Viability of 80% for the single-arm six-axis robot 10C, and Viability of 50% for the Cartesian coordinate robot 10D.

The allowable range database 32e stores required percentage viabilities for applications of the objects as values corresponding to the evaluation criterion. For example, the percentage viability is 75% or more for research use and 90% or more for clinical use. In this case, the allowable range of percentage viability for research is wider than that for clinical use. The percentage viability is an example of the evaluation criterion.

The allowable range database 32e stores, as values corresponding to the evaluation criteria, cell proliferation rates required for the respective applications. When, for example, skin cells as an object are urgently proliferated due to burn injury or the like, a high proliferation rate value is stored. Proliferating skin cells urgently needs the high proliferation rate value, thus narrowing the allowable range in which the protocol can be changed. For example, the proliferation rate value is quantified as a period for cells to double, and the allowable range database 32e stores numerical values such as 3 days for the robot 10, 4 days for the robot 10B, 5 days for the robot 10C, 10 days for the robot 10D, and the like in association with the robot IDs. Skin cells are an example of a type of object to be manufactured.

The allowable range database 32e stores difficulty levels of the respective pieces of work that constitute the protocol. The higher the difficulty level for the work in a given protocol, the more difficult it is to replace the robot, and the narrower the allowable range in which the protocol can be changed. Examples of the difficulty level of work include, in, for example, agitation work with a pipette (pipetting), the difficulty level A that is a high difficulty level of work including a mixing operation to disperse the cells into single cells without damaging the cells, the difficulty level B that is a medium difficulty level of work including a mixing operation without damaging the cells as much as possible, and the difficulty level C that is a low difficulty level of work including a simply mixing operation regardless of an instrument to be used.

Examples of the difficulty level of work in dispensing work include the difficulty level A that is a high difficulty level of work including operation of dispensing along the wall and not directly onto the cells, and efficiently washing away the cells, the difficulty level B that is a medium difficulty level of work including operation of pouring along the wall and not directly onto the cells, and the difficulty level C that is a low difficulty level of work including operation that only requires to pour.

Examples of the difficulty level of work in aspiration work for discarding supernatant include the difficulty level A that is a high difficulty level of work including operation of gently aspirating to avoid swirling up the precipitate and leaving as little supernatant as possible, the difficulty level B that is a medium difficulty level of work including operation of gently aspirating the supernatant to avoid swirling up the precipitate, and the difficulty level C that is a low difficulty level of work including operation of simply aspirating the supernatant regardless of the presence or absence of the precipitate.

When outputting image, the output unit 33 includes, for example, a liquid crystal display element or an electro luminescence (EL) element. When outputting sound, the output unit 33 includes a speaker. The input unit 34 includes, for example, a keyboard and a mouse. The input unit 34 and the output unit 33 have a function of a console of the robot controller 20.

The input/output interface unit 35 executes interface processing between the communication unit 31, the storage unit 32, and the like and the control unit 36.

The control unit 36 includes a CPU 36a, a ROM 36b, a RAM 36c, and the like. The control unit 36 executes various types of control by causing the CPU 36*a* to read and execute codes of various programs stored in the ROM 36*b* or the storage unit 32.

The higher-level controller 30 or the like may have a function of automatically generating various jobs. For example, the higher-level controller 30 or the like generates motion commands based on multiple reference points set in a space within which the robot 10 moves with reference to the protocol database 32*b*. The higher-level controller 30 or the like may modularize the motions of the robot and combine the modules to automatically generate motion commands for the robot 10.

The higher-level controller 30 edits and modifies protocols as the protocol creation device. The higher-level controller 30 creates a protocol chart, generates a job from the protocol chart, and outputs the job to the robot controller 20.

The robot 10, the robot controller 20, and the higher-level controller 30 are connected to enable mutual communication. These connections may be wired or wireless. The robot controller 20 does not need to be accommodated in the body 11 and may control the robot 10 remotely via wireless.

The functions provided by the higher-level controller 30 may be achieved by so-called cloud computing in which the functions are provided by a server at a remote location through an information communication network.

Multiple robots 10 may be provided. The higher-level controller 30 may control the multiple robots 10 to share the work. The higher-level controller 30 may have the functions of the robot controller 20, and the higher-level controller 30 may directly control the robot 10.

The higher-level controller 30 may have the functions of the conversion device 2, the determination device 3, the conversion device 4 (4B, 4C, 4D, etc.), and the evaluation device 5. Alternatively, the conversion device 2, the determination device 3, the conversion device 4 (4B, 4C, 4D, etc.), and the evaluation device 5 may include a computer having a configuration similar to that of the higher-level controller 30. In addition, higher-level controllers such as the higher-level controller 30 may separately exist for the robot 10B, the robot 10C, and the robot 10D. The configuration and functions of these higher-level controllers may be the same as those of the higher-level controller 30, and the details will be omitted here.

1.5 Protocol Chart in First Embodiment

Next, a protocol chart will be described with reference to the figure. FIG. 5 is a schematic diagram illustrating an example of the protocol chart. Here, in the present specification, a protocol chart is a diagram that illustrates a protocol in a visually understandable aspect. The protocol chart describes a series of pieces of work on a work object. As the first embodiment, an example in which an object to be manufactured is a cell will be described here.

The protocol chart illustrated in FIG. 5 includes an initial symbol indicating an initial state of a container accommodating a work object, a final symbol indicating a final state of this container, and work symbols indicating individual pieces of work on the container along a sequence line sL from the initial symbol to the final symbol.

The sequence line sL means order of pieces of work to be performed on the container. That is, the work on the container is performed in the order of the corresponding work symbols placed along the sequence line sL from the initial symbol to the final symbol. A line in a second axial direction that intersects the sequence line sL in a first axial direction is a work line wL. An intersection angle between the sequence line sL and the work line wL does not necessarily have to be a right angle.

The sequence line sL is a line with an arrow so as to clearly indicate the direction indicating the order of the work, but any description method may be used to indicate the direction. Further, since it is clear that the processing is executed from the top to the bottom of the protocol chart here, the sequence line sL may be a simple straight line without an arrow.

A set of the initial symbol, the final symbol, and the sequence line sL connecting the initial symbol and the final symbol indicates a work process performed on one container. Thus, when multiple containers are used in one protocol, multiple sets of these will appear on the protocol chart. The sets of initial symbols, final symbols, and sequence lines sL for different containers are spaced apart.

First, in the protocol chart, an initial symbol written as "MicroPlate6" written at the top indicates an initial state of a container such as the microplate e2. "CO2 Incubator" written in the initial symbol indicates a device such as the incubator e6 in which the container such as the microplate e2 is stored. An initial symbol written as "Tube50" indicates an initial state of a container such as the microtube e3. "Main rack" written in the initial symbol indicates an instrument such as the tube rack e9 in which the container such as the microtube e3 is accommodated.

Here, the initial symbol "MicroPlate6" corresponds to work wk1 for taking out the microplate e2 from the incubator e6. The initial symbol "Tube50" corresponds to work wk7 for taking out the microtube e3 from the tube rack e9.

A final symbol written as "MicroPlate6" indicates a final state of the container such as the microplate e2. "CO2 Incubator" written in the final symbol indicates the device such as the incubator e6 for storing the container such as the microplate e2 after completion of the work of the protocol.

Here, the final symbol "MicroPlate6" corresponds to work wk9 for returning the microplate e2 that work has done to the incubator e6. A final symbol "Tube50" corresponds to work wk10 for returning the microtube e3 that work has done to the tube rack e9.

When work on the container indicates a change in an amount stored in the container, a work symbol indicating the work is placed at a position spaced apart from the sequence line sL in the second axial direction.

For example, a work symbol written as "DISCARD" meaning discard and the sequence line sL are connected by a work line wL in the second axial direction. This work line wL is a line with an arrow pointing away from the sequence line sL to clearly indicate that some or all of the contents in the container are to be discarded. A work symbol written as "ADD" meaning addition and the sequence line sL are connected by a work line wL in the second axial direction. This work line wL is a line with an arrow pointing towards the sequence line sL to clearly indicate that the work is an addition to the container. However, a method of describing a direction is not limited, and the work line wL may be a simple straight line without an arrow.

The work symbol "DISCARD" indicates, as conditions, a contained object to be discarded, in this case "Supernatant", and an amount to be discarded. Here, a symbol "--" means, for example, to discard all or as much of the supernatant as possible. The work symbol "ADD" indicates, as conditions, a reagent to be added, in this case "Reagent A", and an amount to be added. As illustrated in FIG. 5, pieces of work corresponding to the work symbol "DISCARD" are indicated by the work wk2 and the work wk5. Pieces of work corresponding to the work symbol "ADD" are indicated by the work wk3 and the work wk6.

When work on the container does not indicate a change in an amount stored in the container, a work symbol indicating this work is placed on the sequence line sL.

For example, a work symbol "MIX" indicates work of agitating the contents. The work symbol "MIX" indicates, as conditions, an agitation method (an instrument used for agitation), a temperature, and an agitation time. Here, examples of the agitation method include a method of agitating by pipetting with the dispenser e1, a method of agitating with a vortex mixer, and a method of agitating with a microplate mixer. The work with the work symbol "MIX" corresponds to work wk4.

When work is transfer between containers, a work symbol (e.g., a work symbol "TRANSFER") is placed between the sequence line sL for a source container and the sequence line sL for a destination container. Further, a work line wL is placed along the second axial direction from the sequence line sL to the sequence line sL. Here, a line with an arrow is used as the work line indicating a transfer direction. Of course, the description method for indicating the transfer direction is not limited to a line with an arrow, and any other method may be used. As illustrated in FIG. 5, the work corresponding to the work symbol "TRANSFER" is indicated by work wk8.

When the same work is to be repeated, a repeat line indicating repetition of the work may be drawn from the sequence line sL and returned to the sequence line sL upstream of the repeated work symbol.

Next, work and operation included in the work will be described with reference to the figures.

As illustrated in FIG. 5, the pieces of work corresponding to the work symbols, the initial symbols, the final symbols, and the like shown in the protocol chart are basic work units such as dispensing, agitation, and centrifugation and are also referred to as commands. These work units can be further broken down into operation by the robot 10 on instruments. A protocol is also a work procedure that combines commands to perform a desired experiment or other work.

For example, in the transfer work wk8, aspiration operation of aspirating a medium m in a well W using the dispenser e1 while tilting the microplate e2 as illustrated in FIGS. 6A and 6B, discharge operation of discharging the medium m to wash away cells c as illustrated in FIG. 6C, operation of pipetting with the dispenser e1 and loosening the cells c to disperse the cells c as illustrated in FIG. 6D, and operation of collecting the cells c into the microtube e3 as illustrated in FIG. 6E are performed. The operation performed by the robot 10 on instruments such as the dispenser e1 and the microplate e2 correspond to so-called hand techniques. Here, these pieces of operation are basic for performing the work and are basic operation for the instruments used by the robot 10 for the work. The basic operation is operation that is initially set for work, for example, when a protocol is initially set. The basic operation is operation to be basic.

As illustrated in FIG. 7, for these pieces of operation, there are basic operating parameters such as a dispensing amount, a height of the tip T during aspiration, a height h of the tip T during discharge, a discharge speed v, and the number of pieces of pipetting n.

In the case of the work wk1 of taking out the microplate e2 from the incubator e6, operation of opening a door of the incubator e6, operation of taking out the microplate e2 from the incubator e6, operation of closing the door of the incubator e6, and the like are the basic operation.

In cases of the work wk3 and the work wk6 for addition, operation of grasping the dispenser e1, operation of attaching the tip T to the tip of the dispenser e1, operation of moving the dispenser e1 to the reagent bottle, operation of aspirating liquid to be added from the reagent bottle, operation of grasping the microplate e2, operation of discharging a predetermined amount of liquid into each well of the microplate e2, and the like are the basic operation, and an amount of liquid to be discharged, a discharge speed, and the like are the basic operating parameters.

In the case of the work wk4 of agitating the microplate e2, operation of moving the microplate e2 to the microplate mixer, operation of placing the microplate e2 on the microplate mixer, and the like are the basic operation, and a rotation speed of the microplate mixer, placement time, and the like are the basic operating parameters.

In the case of work of centrifuging the microtube e3, operation of opening the lid of the centrifuge e5, operation of setting the microtube e3 in the centrifuge e5, operation of closing the lid of the centrifuge e5, operation of switching on the centrifuge e5 and waiting, operation of switching off the centrifuge e5 and taking out the microtube e3, and the like are the basic operation, and a centrifugal strength, a centrifugal time, and the like are the basic operating parameters.

In the case of work of discarding the supernatant from the microtube e3, operation of inserting a tip of the aspirator into the microtube e3, operation of tilting the microtube e3, operation of aspirating with the aspirator, and the like are the basic operation. A height of the tip of the aspirator, a tilt angle, an aspiration speed, and the like are the basic operating parameters.

In the field of biological engineering, there are many types of work in which subtle differences in hand techniques and operation can affect results. In such work, good results can only be achieved by experienced and skilled workers. Even skilled workers do not always obtain the same results. In addition, such a tip and experience are expressed as tacit knowledge such as "carefully", "quickly", or "accurately", and may be difficult to translate into the work for the robot 10. Thus, only the basic operation for the robot 10 may not yield good results. That is, even when the protocol is executed by changing the basic operating parameters using an experimental design method or the like, a predetermined evaluation may not be obtained.

When the predetermined evaluation is not obtained even when the protocol is executed by changing the basic operating parameters using the experimental design method or the like, the protocol is modified by a supplementary operation that supplements the basic operation. The supplementary operation includes, for example, a first type of supplementary operation, a second type of supplementary operation, a third type of supplementary operation, and the like.

Here, in the field of biological engineering, there are many types of work in which subtle differences in hand techniques and operation can affect results. Thus, when a human performs work, even when the basic operating parameters are set, the evaluation of the work is not reliable due to variations occurred in the work. Further, humans tend to make incorrect counts or operational errors due to fatigue, misunderstandings, or the like, so the results of the work are easily influenced by chance.

On the other hand, the robot 10 is highly reproducible in work and performs work reliably for set parameters and produces results. Therefore, it is possible to accurately evaluate the work, and the parameter space can be reliably traced by varying the basic operating parameters. Thus, when the operation is performed by the robot 10, it is more certain that the predetermined evaluation will not be obtained, and when the predetermined evaluation is not obtained even after completely tracing the parameter space, limitations of the basic operation become clear. Taking into account the limitations of the basic operation, it is possible to proceed to the next step, the supplementary operation.

Hereinafter, the first type of supplementary operation, the second type of supplementary operation, and the third type of supplementary operation will be described with reference to the figures.

A modification of the protocol by the first type of supplementary operation is written as a code in the robot program and is a modification of changing a fixed value to another value or parameterizing the fixed value. Here, the fixed value is a predetermined and fixed set value in the robot program. The basic operating parameters are set values that can be changed in the robot program. The basic operating parameters may be modified interactively in the protocol chart.

For example, in the discharge operation of discharging the medium m to wash away the cells c as illustrated in FIG. 6C, the first type of supplementary operation is operation of changing a tilt of the tip T, as illustrated in FIG. 8. As illustrated in FIG. 8, the first type of supplementary operation may be operation of changing the tilt of the tip T and discharging. This first type of supplementary operation is added to the work or is replaced with other operation, thus modifying the protocol. The first type of supplementary operation is an example of a supplementary operation that is added when performing work. The first type of supplementary operation is an example of a supplementary operation generated by changing a fixed value.

Operation of washing away the cells c at an edge of the well W by making a relative angle between a wall of the well W and a pipette zero and discharging the medium m at an angle along the wall of the well W (e.g., 120 [degrees]). A new parameter of the relative angle between the wall of the well W and the pipette may be set as a supplementary operating parameter.

Next, a modification of the protocol by the second type of supplementary operation is a modification in which a newly created operation for the instrument is added to the work of the protocol or another operation is replaced with the newly created operation. The second type of supplementary operation includes operation of observation and discover, operation of an apparent tip. The second type of supplementary operation may also be operation of achieving a technique of a skilled worker called the worker with God's hands. These second type of pieces of supplementary operation are added to the work or replaced with other operation. The second type of supplementary operation is an example of a supplementary operation that is added when performing work. The second type of supplementary operation is an example of a newly added operation different from the supplementary operation generated by changing a fixed value.

For example, in the discharge operation of discharging the medium m to wash away the cells c as illustrated in FIGS. 8 and 9A, even when the number of pieces of pipetting operation is increased or the discharging is repeated only at the same point, the cells c may remain in an upper portion of the well W.

However, as illustrated in FIG. 9B, when the tip T discharges while changing the position thereof by moving in an arc from position (1) to (2) to (3), fewer cells c is missed, and a collection rate is increased. Instead of the operation of discharging the medium and washing away the cells at the position (1) at the tip angle of 120 degrees during discharge, a supplementary operation is newly added to the work in which the tip T is moved in an arc from position (1) to (2) to (3) while maintaining the tip angle of 120 degrees during discharge, and the medium is discharged to wash away the cells.

Regarding the agitation work for the work symbol "MIX" or the like, when the operation of placing the microplate e2 on the mixer e4 such as a microplate mixer and operation of agitating by swinging the microplate e2 are the basic operation, operation illustrated in FIG. 10 and operation illustrated in FIG. 11 are the second type of supplementary operation.

As illustrated in FIG. 10, operation of repeatedly rotating the hand 14 relative to the arm 13 within a predetermined angle range while the hand 14 grasps the microplate e2 or the like is the second type of supplementary operation. This allows the cells and medium inside the well W to be agitated by gravity and swinging.

As illustrated in FIG. 11, operation of swinging the microplate e2 or the like horizontally in a figure-eight pattern is the second type of supplementary operation. The microplate e2 is moved in a figure-eight trajectory tr. This supplementary operation allows, even when an amount of the medium is large, a "gently" agitating operation expressed in tacit knowledge to be achieved by applying centrifugal force while suppressing a risk of spilling the medium due to tilting of the microplate e2.

Information for converting these second type of pieces of supplementary operation into jobs is stored in the protocol database 32b.

Next, a modification of the protocol by the third type of supplementary operation is a modification of the protocol by operation that cannot be performed by normal humans. One example is a case in which a value is set beyond the setting range of the basic operating parameters or the like. Examples of the third type of supplementary operation include operation of repeating a basic operation exactly 100 times, operation of moving a scraper while maintaining a clearance of 0.1 mm, and operation of moving a certain instrument at an extremely low speed. The third type of supplementary operation is an example of a supplementary operation that is added when performing work.

Application software may be activated in a protocol creation device such as the higher-level controller 30 to read a protocol chart and execute editing such as editing the work in a protocol and modifying the protocol by a basic operation and a supplementary operation.

The protocol database 32b may store in advance information on the basic operation, information on the first type of supplementary operation, information on the second type of supplementary operation, and information on the third type of supplementary operation in association with information on classifications of each operation. The information on the basic operation is information on basic operating parameters, such as, in the case of "TRANSFER" of the work wk8 in the protocol, a dispensing amount, a height of the tip during aspiration, an aspiration speed, a height of the tip during discharge, a discharge speed, and the number of pieces of pipetting. The information on the first type of supplementary operation is, for example, information on a fixed value that can be converted into a variable, such as a tip angle during discharge. The information on the second type of supplementary operation is, for example, a new operation name and information for converting the second type of supplementary operation into jobs. The information on the third type of supplementary operation includes, for example, ranges for parameters, limit values for the parameters, and the like.

1.6 Functional Configuration of Robot Program Generation System

Next, a functional configuration of the robot program generation system will be described. FIG. 12 is a block diagram illustrating an example of the functional configuration of the robot program generation system according to the embodiment.

As illustrated in FIG. 12, the robot program generation system S includes a protocol acquisition unit 1a, a first conversion unit 1b, an execution unit 1c, a protocol modification information acquisition unit 1d, a protocol modification unit 1e, a determination unit 1f, a second conversion unit 1g, a manufacturing unit 1h, a display control unit 1i, an evaluation acquisition unit 1j, and a modification information generation unit 1k.

The protocol acquisition unit 1a acquires a protocol representing multiple pieces of work in the field of biological engineering. The control unit 36 of the higher-level controller 30 that achieves the functions of the protocol creation device 1, which is an example of the protocol acquisition unit 1a, may acquire a protocol that can be displayed in a protocol chart from the database of the storage unit 32, may acquire the protocol from an external server device via a network, or may acquire the protocol from a recording medium using a drive device.

The first conversion unit 1b converts the protocol representing multiple pieces of work in the field of biological engineering into the first program that can be executed by the first robot. The conversion device 2 converts a protocol chart, which is an example of a protocol, into a robot program in which jobs are incorporated as codes. The robot 10 operates according to the robot program.

The execution unit 1c controls the robot 10 to perform the pieces of work according to the protocol. For example, the control unit 36, which is an example of the execution unit 1c, converts the acquired protocol into jobs and transmits the jobs as motion commands to the robot controller 20, and the robot controller 20 causes the robot 10 to perform the work according to the protocol based on the jobs.

The protocol modification information acquisition unit 1d acquires, to modify the protocol after the first robot has performed multiple pieces of work according to the first program, modification information for at least one of the basic operation that is basic for performing work and is for an instrument used by the first robot for the work or the supplementary operation that supplements the basic operation. For example, the protocol creation device 1 acquires information on the protocol modification from the evaluation device 5 or the like.

For example, after performing the multiple pieces of work, the evaluation device 5 or the like executes evaluation based on measurement results obtained by applying a measuring instrument to the resulting products, and image processing on images of the resulting products and a state of the work. Based on the evaluation, the protocol modification information acquisition unit 1d acquires information on the classification of at least one of the basic operation, the first type of supplementary operation, the second type of supplementary operation, or the third type of supplementary operation as the information on the protocol modification. In the case of the basic operation, a value of the basic operating parameter may be the information on the protocol modification.

In the case of the first type of supplementary operation, the information on the protocol modification is, for example, information for changing a fixed value to another value or parameterizing the fixed value.

In the case of the second type of supplementary operation, the information on the protocol modification is information for adding a newly created operation for the instrument to the work of the protocol or replacing another operation with the newly created operation, or the like.

In the case of the third type of supplementary operation, the information on the protocol modification is information for setting a value beyond the setting range of the basic operating parameter or the like.

With reference to the protocol database 32b, the protocol is modified by changing the basic operating parameter or by adding the first type of supplementary operation, the second type of supplementary operation, or the third type of supplementary operation. The protocol may be modified by combining the basic operation and the supplementary operation. The information on the protocol modification may be information about adding work or replacing work. New work may be created by combining the basic operation and the supplementary operation.

The determination unit 1f determines whether the modified protocol can be converted into the second program in accordance with the modified protocol. The determination device 3 makes a determination in accordance with an allowable range in which the modified protocol can be changed. Further, the control unit 36 may make a determination in accordance with the allowable range in which the modified protocol can be changed with reference to the allowable range database 32e.

The second conversion unit 1g converts the modified protocol into the second program that can be executed by the second robot different from the first robot. The conversion device 4 converts the modified protocol into the second robot program within the allowable range. Further, the control unit 36 may convert the modified protocol into the second robot program with reference to the protocol database 32b.

The manufacturing unit 1h causes the robot 10, 10B, 10C, 10D, or the like to manufacture the object based on the modified protocol. For example, the control unit 36, which is an example of the manufacturing unit 1h, converts a series of protocols including the modified protocol into jobs and transmits the jobs as motion commands to the robot controller 20, and the robot controller 20 causes the robot 10 to perform a series of pieces of work according to the series of protocols based on the jobs to manufacture the object. From the protocol charts for the respective protocols, a robot program corresponding to a series of protocols is generated, and according to this robot program, the robot 10 manufactures the object. Alternatively, in this way, the conversion device 4, which is an example of the manufacturing unit 1h, may cause the robot 10, 10B, 10C, 10D, or the like to manufacture the object according to this robot program.

The display control unit 1i causes a display unit to display a supplementary operation input screen that includes an item representing a supplementary operation and receives input for the supplementary operation. For example, the controller 36, which is an example of the display control unit 1i, causes the output unit 33 to display an input screen.

The evaluation acquisition unit 1j acquires evaluation information obtained by evaluating results of performing the multiple pieces of work. For example, the control unit 36, which is an example of the evaluation acquisition unit 1j, acquires the information on the protocol modification from the evaluation device 5 or the like, or receives the information on the protocol modification from the input screen displayed on the output unit 33.

The modification information generation unit 1k generates modification information based on the evaluation information. For example, the control unit 36, which is an example of the modification information generation unit 1k, selects a basic operating parameter to be changed, changes a value of the basic operating parameter, and generates a protocol based on the changed basic operating parameter, or modifies the protocol by the first type of supplementary operation, the second type of supplementary operation, or the third type of supplementary operation based on the information on the classification of the operation.

2. Operation Example of Robot Program Generation System S

As an operation example of the robot program generation system S, a cell manufacturing process as an example of manufacturing an object, an operation example of generating a modified protocol, creation of a protocol chart, and an operation example of manufacturing an object will be described with reference to the figures.

2.1 Cell Manufacturing Process

As an example of the manufacturing an object, a cell manufacturing process will be described with reference to FIGS. 13A and 13B. FIGS. 13A and 13B are block diagrams illustrating examples of cell manufacturing processes according to the embodiment.

As illustrated in FIG. 13A, the cell manufacturing process includes shipment arrival p1, receiving inspection p2, cell culture p3, inspection p4, storage p5, delivery inspection p6, and shipment p7.

In the process of the shipment arrival p1, IDs such as a work object ID of the arrived work object and a work object type ID are assigned. The work object is a somatic cell, a germ cell, a stem cell, a cancer cell, or a primary cell and cell line derived therefrom. The work object may be a genome-edited cell and artificial cell, a transgenic cell and artificial cell, or the like.

The higher-level controller 30 transmits a motion command to the robot controller 20 so as to execute a protocol of shipment arrival. Under control of the robot controller 20, the robot 10 assigns an ID to the arrived work object according to the protocol of shipment arrival. The robot 10 may take an image of, for example, an address of a sender or the like of the work object and convert the image into data through character recognition. A person may read a shipment arrival code or the like using a code reader, and the higher-level controller 30 may receive the read information.

In the process of the receiving inspection p2, when the work object such as a specimen or a sample arrives in a frozen state, the work object is thawed and inspected. For example, a predetermined inspection such as the life or death of the arrived cells is performed. The higher-level controller 30 transmits a motion command to the robot controller 20 so as to execute a protocol of receiving inspection. Under the control of the robot controller 20, the robot 10 inspects the arrived work object according to the protocol of receiving inspection. A person may inspect the work object and the higher-level controller 30 may receive inspection results.

Protocols for executing the process of the cell culture p3, include (1) a protocol for seeding cells, (2) a protocol for replacing a medium, (3) a protocol for checking cells, (4) a protocol for passaging cells, and the like. The higher-level controller 30 transmits a motion command to the robot controller 20 so as to execute these protocols in order. Under the control of the robot controller 20, the robot 10 performs pieces of work in the respective protocols for the cell culture.

Here, the protocol for seeding cells is, for example, a protocol for seeding cells into the microplate e2 and storing the microplate e2 in the incubator e6.

The protocol for replacing a medium is, for example, a protocol in which the medium is replaced once every one to three days.

The protocol for checking cells includes a protocol for checking contamination such as mold growth during culturing in the incubator e6, and a protocol for checking whether the number of cells in a plate area has increased to a predetermined amount.

The protocol for passaging cells includes a protocol for collecting cells trypsinized and cultured.

The process of the cell culture p3 may be a process of culturing cells and processing cell culture products produced through metabolism, or a process of culturing cells to produce cells for regenerative medicine, cell preparations, artificial organs, organoids, or the like. Alternatively, the process of the cell culture may be a process of culturing production cells of insulin, interferon, antibodies, or the like. Alternatively, the process of the cell culture may be an inspection process for quality control of the cell culture process. Before cells are cultured, work may be performed to incorporate DNA, RNA, or the like into cells, bacteria, or the like. DNA, RNA, or the like to be incorporated may be extracted from the arrived specimen.

In the process of the inspection p4, confirmation of the number of viable cells and inspection for *mycoplasma* contamination and the like are performed. According to the inspection protocol, the robot 10 inspects the manufactured cells. The higher-level controller 30 transmits a motion command to the robot controller 20 so as to execute the protocol of inspection. Under the control of the robot controller 20, the robot 10 inspects the manufactured cells according to the protocol of inspection. A person may inspect the manufactured cells, and the higher-level controller 30 may receive inspection results.

In the process of the storage p5, for example, the manufactured cells are placed in a cryotube or the like containing a medium containing a cryoprotectant, frozen at −80° C., and stored in a liquid nitrogen container. The higher-level controller 30 transmits a motion command to the robot controller 20 so as to execute a protocol of storage. Under the control of the robot controller 20, the robot 10 stores the manufactured cells according to the protocol of storage. A person may store the manufactured cells, and the higher-level controller 30 may receive storage results.

In the process of delivery inspection p6, the cryotube is taken out, partially thawed, and inspected before shipping. The higher-level controller 30 transmits a motion command to the robot controller 20 so as to execute a protocol of pre-shipment inspection. Under the control of the robot controller 20, the robot 10 inspects cells according to the protocol of pre-shipment inspection. A person may inspect the cells, and the higher-level controller 30 may receive inspection results.

In the process of the shipment p7, the cryotubes to be shipped are packed in a bag or the like for cold storage and shipped. Based on a motion command from the higher-level controller 30, the robot 10 packs the cryotubes to be shipped into the bag for cold storage under the control of the robot controller 20. A person may perform the shipping work, and the higher-level controller 30 may receive work results.

The higher-level controller 30 stores information on the processes in the management database 32a in association with the process IDs of the respective processes.

When manufacturing a cell preparation such as interferon, as illustrated in FIG. 13B, a process of a concentration and purification pp is inserted between the process of the cell culture p3 and the process of the inspection p4. In the process of the concentration and purification pp, insulin, interferon, antibodies, or the like produced by the production cells are concentrated. In processes after the concentration and purification pp, the cell preparation is inspected, stored, inspected for shipment, and shipped.

2.2 Operation Example of Generating Modified Protocol

First, an operation example of generating a modified protocol will be described with reference to the figures. For protocol charts for passaging cells, in particular, using an example of a protocol chart for trypsinization, operation of optimizing a protocol as much as possible will be explained.

FIG. 14 is a flowchart illustrating an operation example of generating a modified protocol. FIGS. 15 and 16 are schematic diagrams illustrating examples of screens.

As illustrated in FIG. 14, the protocol generation system S1 of the robot program generation system S acquires a protocol (step S1). To be specific, the higher-level controller 30, as the protocol creation device 1, with reference to the protocol database 32b, acquires information on the protocol. For example, information on a protocol chart such as the one illustrated in FIG. 5 for the trypsinization in a protocol for passaging cells in the process of the cell culture p3 is acquired. In the case of input by a person, as illustrated in FIG. 5, a "File" button is clicked by the input unit 34 on the screen 40, a protocol for trypsinization is selected from a pull-down menu, and a protocol chart is read from the protocol database 32b. The higher-level controller 30 may acquire the protocol from an external server device via a network.

The higher-level controller 30 may receive input of a protocol from the input unit 34, a terminal device, or the like. In receiving human input, as illustrated in FIG. 5, on the screen 40, the "File" button is clicked using the input unit 34, a list of protocols is displayed from an "Open" menu, and a protocol to be executed is selected.

Subsequently, the protocol generation system S1 converts the protocol into a robot program (step S2). To be specific, the higher-level controller 30, as the protocol creation device 1 and the conversion device 2, with reference to the protocol database 32b based on the protocol ID, converts the acquired protocol into jobs for the robot 10 and generates motion commands. The higher-level controller 30 transmits the motion commands to the robot controller 20.

Subsequently, the protocol generation system S1 executes the robot program (step S3). To be specific, the robot controller 20 generates motion signals for operating the robot 10 based on the received jobs and controls the motions of the robot 10. The robot 10 performs pieces of work.

The higher-level controller 30 may receive execution of the protocol from the input unit 34, a terminal device, or the like. In receiving human input, as illustrated in FIG. 5, on the screen 40, a "JobGenerate" button is clicked using the input unit 34, and jobs are generated from the protocol chart. On the screen 40, when a "Run" button is clicked using the input unit 34, motion commands are transmitted from the higher-level controller 30 to the robot controller 20, and the robot controller 20 controls the robot 10 to execute the protocol.

The robot 10 performs a series of pieces of work from the work wk1 to the work wk10 in the protocol chart. The robot 10 also executes other series of protocols.

Subsequently, the protocol generation system S1 evaluates performance results (step S4). To be specific, the higher-level controller 30, as the evaluation device 5, with reference to the evaluation database 32c, evaluates the performance results from data from sensors of the robot 10, measurement data from a measuring instrument that is an example of the instrument used by the robot 10, the analysis data from an analyzer, and the like.

The higher-level controller 30, by executing image processing on an image captured by the camera or the like of the hand 14, extracting and digitizing features, calculates and evaluates performance results with reference to the evaluation database 32c, and acquires evaluation information obtained by evaluating results of performing the multiple pieces of work.

For example, in the case of cell culture, as the performance results, a cell density, a single cell dispersion, a cell viability, and the like are measured from images and measurement data in the microplate e2, the microtube e3, and the cell counter. The cell density and the single cell dispersion are measured by comparison with features such as cell images, matching with a template image, machine learning, or the like. The cell viability is measured by comparison of features such as images of living cells and dead cells, matching with a template image, machine learning, or the like.

The robot 10 may automatically use various measuring instruments to obtain results of measuring a resulting product obtained by performing. The higher-level controller 30 executes a protocol of evaluation, whereby the robot 10 takes out a portion of a cell suspension collected in the tube, measures this portion using a measuring instrument, and acquires a measurement result from the measuring instrument.

The higher-level controller 30 executes evaluation, with reference to the evaluation database 32c, by comparing the measurement results with a predetermined cell number and a predetermined viability.

The higher-level controller 30 determines from the images of each operation whether the operation are good operation such as "no bubbles", "no dripping", and "even mixing". Determination may be made by matching with a template image or the like of bubbles or normal cells, machine learning, or the like.

The higher-level controller 30 may receive inputs such as measurement results of the resulting product obtained by performing, evaluation results, and a comprehensive evaluation from the input unit 34, a terminal device, or the like. Application software may be activated in a protocol creation device such as the higher-level controller 30 to read the protocol chart and input the measurement results or evaluation results.

Subsequently, as illustrated in FIG. 15, the higher-level controller 30 displays the evaluation results shown on a screen 41 on the output unit 33. The higher-level controller 30 records the evaluation results in the history database 32d in association with the execution ID, the protocol ID, the work ID, the operation ID, and the like.

Subsequently, the protocol generation system S1 determines whether the measurement result or the evaluation result is greater than or equal to a predetermined value (step S5). To be specific, the control unit 36 of the higher-level controller 30, as the evaluation device 5, with reference to the evaluation database 32c, determines whether the measurement results or the evaluation result is greater than or equal to the predetermined value. As illustrated in FIG. 15, the control unit 36 determines whether a comprehensive evaluation combining the cell density, the single cell dispersion, the cell viability, and the like is greater than or equal to the predetermined value.

If the evaluation of the performance result is greater than or equal to the predetermined value (step S5; YES), the protocol generation system S1 outputs the modified protocol (step S8). To be more specific, the control unit 36 of the higher-level controller 30, as the protocol creation device 1, associates an improved protocol closer to the optimum with the protocol ID, and stores the improved protocol in the protocol database 32b or outputs the improved protocol to the conversion device 2 and the determination device 3.

If the evaluation of the performance result is not greater than or equal to the predetermined value (step S5; NO), the protocol generation system S1 acquires information on the protocol modification (step S6). To be specific, the control unit 36 of the higher-level controller 30, as the protocol creation device 1, acquires, as the information on the protocol modification, information on the classification of at least one of the basic operation, the first type of supplementary operation, the second type of supplementary operation, or the third type of supplementary operation.

For example, when there are still basic operating parameters to be tried within a predetermined range in which the basic operating parameter can be changed, or when the basic operating parameters have not been changed in the experimental design method, the control unit 36 sets the information on the classification of the operation to the basic operation in order to modify the protocol by the basic operation.

When there are no basic operating parameters to be tried, the information on the classification of the operation is set to the first type of supplementary operation in order to modify the protocol by the first type of supplementary operation. The second type of supplementary operation or the third type of supplementary operation may be set. The information on the classifications of these pieces of operation is an example of information on the supplementary operation to be added when performing the work.

When the range of the first type of supplementary operating parameters to be tried has ended, the information on the classification of the operation is set to the second type of supplementary operation or the third type of supplementary operation in order to modify the protocol by the second type of supplementary operation or the third type of supplementary operation.

In the case of the basic operation, on the screen 40 as illustrated in FIG. 5, a menu "Edit" for protocol editing may be selected and "TRANSFER" of the work wk8 may be clicked, and an input screen 42 for changing the values of the basic operating parameters may be displayed on the output unit 33, as illustrated in FIG. 16. The higher-level controller 30 may receive input for changing the basic operating parameter from the input screen 42 as the information on the protocol modification.

Thus, in order to modify the protocol after the first robot has performed multiple pieces of work according to the first program, the higher-level controller 30 functions as an example of the protocol modification information acquisition unit that acquires modification information for at least one of a basic operation that is basic for performing work and is for an instrument used by the first robot for the work or a supplementary operation that supplements the basic operation.

Subsequently, the protocol generation system S1 modifies the protocol (step S7). To be specific, the control unit 36 of the higher-level controller 30, as the protocol creation device 1, executes a subroutine for modifying a protocol to determine whether the received modification information is for a modification of the basic operation or for a modification of the supplementary operation and modifies the basic operation or the supplementary operation with reference to the protocol database 32b. Details will be described later in the subroutine for modifying a protocol.

Thus, the higher-level controller 30 functions as an example of the protocol modification unit that modifies a protocol according to the acquired modification information.

2.3 Subroutine for Modifying Protocol

Next, the subroutine for modifying a protocol will be described with reference to the figures.

FIG. 17 is a flowchart illustrating the subroutine for modifying a protocol. FIGS. 18 to 20 are schematic diagrams illustrating examples of screens.

As illustrated in FIG. 17, the protocol generation system S1 determines whether the basic operation is to be modified (step S10). To be specific, the higher-level controller 30 determines whether the acquired information on the protocol modification is for a modification of the basic operation based on the information on the classification of the operation.

If the basic operation is to be modified (step S10; YES), the protocol generation system S1 modifies the basic operation (step S11). To be specific, the control unit 36 of the higher-level controller 30, with reference to the protocol database 32b, obtains information on basic operating parameters (modification information for the operation, an example of modification information for the basic operation). The higher-level controller 30 selects a basic operating parameter to be changed, changes a value of the basic operating parameter, and generates a protocol based on the changed basic operating parameter. For example, the value of the basic operating parameter is changed based on the results performed with various combinations of basic operating parameters by the experimental design method. Thus, the modification information for the basic operation includes change information of the parameter value of the basic operating parameter in the basic operation.

Thus, the higher-level controller 30 functions as an example of the modification information generation unit that generates modification information based on the evaluation information.

As illustrated in FIG. 16, a dispensing amount, a height of a tip of the tip T during aspiration, an aspiration speed, a height of the tip of the tip T during discharge, a discharge speed, the number of repetitions of pipetting, and the like are examples of the values of the basic operating parameters.

Alternatively, the control unit 36 of the higher-level controller 30 may select the basic operating parameter to be changed based on the evaluation result and change the value of the basic operating parameter. For example, when the density is low in the evaluation in step S4, the higher-level controller 30 lowers the height h of the tip end during discharge and increases the number of pieces of pipetting n.

When the single cell dispersion is small, the higher-level controller 30 increases the discharge speed v and the number of pieces of pipetting n. When the viability is low, the higher-level controller 30 increases the height h of the tip end during discharge and decreases the discharge speed v and the number of pieces of pipetting n.

As illustrated in FIG. 18, the higher-level controller 30, with reference to the evaluation database 32*c*, the history database 32*d*, and the like, may display a "Suggestion" screen 43 displayed on the output unit 33. As the information on the protocol modification, candidates for the basic operation to be modified, candidates for the basic operating parameter values to be modified, and a direction of modification are calculated.

The higher-level controller 30 may select a basic operating parameter to be changed and change the value of the basic operating parameter based on results of machine learning or the like with reference to the history database 32*d*. The higher-level controller 30 may identify, as the information on the protocol modification, which protocol causes an issue to identify which work in the protocol causes the issue and which operation of the work causes the issue, using artificial intelligence such as machine learning with reference to the evaluation database 32*c*, the history database 32*d*, and the like based on the evaluation result.

In step S6, the control unit 36 of the higher-level controller 30 displays the input screen 42 as illustrated in FIG. 16 as the information on the protocol modification, and simply receives a change of the basic operating parameter from the input screen 42. The higher-level controller 30 may then change the value of the basic operating parameter and generate a protocol based on the changed basic operating parameter. For example, the item of the number of pieces of pipetting is selected, and a protocol is generated in which the number is changed from "3" to "4".

Subsequently, returning to step S2, the protocol generation system S1 converts the modified protocol into a robot program.

If the basic operation is not to be modified (step S10; NO), the protocol generation system S1 modifies the protocol by the supplementary operation (step S12). To be specific, when the modification of the basic operation alone does not provide sufficient improvement in the evaluation of results of the protocol execution, the control unit 36 of the higher-level controller 30 modifies the protocol by the first type of supplementary operation, the second type of supplementary operation, or the third type of supplementary operation, based on the information on the classification of the operation. The modification information for the supplementary operation includes additional information on the supplementary operation to be added in performing the multiple pieces of work.

Thus, the higher-level controller 30 functions as an example of the modification information generation unit that generates modification information based on the evaluation information.

In the case of the first type of supplementary operation, to be specific, the higher-level controller 30, with reference to the protocol database 32*b*, acquires, as the information on the protocol modification, information on a fixed value whose value is to be changed among fixed values that are set not to be changed in response to the basic operation. The higher-level controller 30 selects the fixed value to be changed, changes the fixed value to another value, and generates a protocol based on the first type of supplementary operation. The information on this protocol modification is an example of second change information to change a value set as unchanged in response to the basic operation in the code of the first program.

The control unit 36 adds the first type of supplementary operation to the protocol for changing the tilt of the tip T, as illustrated in FIG. 8. For example, the control unit 36 inserts the first type of supplementary operation in which the tilt of the tip T is changed as illustrated in FIG. 8 into the operation of "TRANSFER" of the work wk8 of the protocol.

Protocol application software that, for example, edits and executes the protocol may be modified so that the input screen 44 illustrated in FIG. 19 can be displayed. The input screen 44 includes, as an example of an item display representing the supplementary operation, a parameter name 44*a* for a parameter corresponding to the first type of supplementary operation and a parameter input field 44*b* for the parameter corresponding to the first type of supplementary operation. The fixed value of the first type of supplementary operation may be parameterized like these.

In the protocol application software, the first type of supplementary operation may be added by editing the protocol.

In step S6, the control unit 36 may display the input screen 44 on the output unit 33 and receive the protocol modification by the first type of supplementary operation from the input field 44*b* as the information on the protocol modification.

The higher-level controller 30 may change a fixed value that is set as unchanged in response to the basic operation to another fixed value or may change an operating parameter that is set as a fixed value in a program into a variable. The control unit 36 may generate the first type of supplementary operation by converting an operating parameter that is written as a code in the robot program but is still a fixed value into a variable and setting the variable to a certain value. The change in the value of the first type of supplementary operating parameter may be changed based on results performed with various combinations of supplementary operating parameters by the experimental design method.

Next, in the case of the second type of supplementary operation, to be specific, the higher-level controller 30, with reference to the protocol database 32*b*, reads the second type of supplementary operation to be added or replaced. The higher-level controller 30 identifies a position of the protocol of operation to be added or replaced in the protocol, adds or replaces the second type of supplementary operation, and generates a protocol based on the second type of supplementary operation.

As illustrated in FIG. 9B, the control unit 36 adds, to the work of the protocol, the second type of supplementary operation of changing the position of the tip T to discharge from the dispenser e1 multiple times. Alternatively, as illustrated in FIG. 10 or 11, the control unit 36 adds or replaces the second type of supplementary operation of moving the microplate e2 to the work of the protocol.

In the protocol application software, the second type of supplementary operation may be added by editing the protocol.

The higher-level controller 30 adds the second type of supplementary operation to the protocol or replaces the second type of supplementary operation with another operation. When converting the protocol into jobs, the higher-level controller 30 generates codes that include the second type of supplementary operation in the robot program.

In the case of the second type of supplementary operation as illustrated in FIG. 9B, the protocol application software may be modified so that an input screen 45 as illustrated in FIG. 20 can be displayed. The input screen 45 includes, as an example of an item display representing the supplementary operation, a parameter name 45*a* for a parameter corresponding to the second type of supplementary operation and a parameter input field 45*b* for the parameter corresponding to the second type of supplementary operation. The display of the name 45*a* and the parameter input field 45*b* may be emphasized so that it can be distinguished from the basic operation and recognized as the supplementary operation.

As illustrated in FIG. 20, new hand techniques such as the second type of supplementary operation are given specific names and made selectable from the protocol application software. For example, the control unit 36 controls the display so that a new operation of "cell-collecting hand technique: arc-like discharging hand technique" can be displayed on a "Parameter of TRANSFER" page that is displayed by clicking the work wk5 in the protocol chart. The name of the new operation may be a simple identification name or the name of the originator.

The second type of supplementary operation of the new hand technique edited and created in the protocol application software is stored in the protocol database 32*b* in association with the supplementary operation ID, together with the name of the new hand technique and the information on the corresponding job. The contents of the second type of supplementary operation in the protocol database 32*b* may be shared with other robots.

In step S6, the control unit 36 may display the input screen 45 on the output unit 33 and receive the protocol modification by the second type of supplementary operation from the input field 45*b* as the information on the protocol modification.

Thus, the higher-level controller 30 functions as an example of the display control unit that causes the display unit to display a supplementary operation input screen that includes an item representing a supplementary operation and receives input for the supplementary operation.

Next, in the case of the third type of supplementary operation, to be specific, the higher-level controller 30, with reference to the protocol database 32*b*, acquires information on operating parameters that significantly change values (basic operating parameters and supplementary operating parameters that parameterize the supplementary operation) and a setting range of the operating parameters as information on the protocol modification. The higher-level controller 30 selects the operating parameter and sets a value exceeding a predetermined limit value for the operating parameter value to the selected parameter to generate a protocol based on the third type of supplementary operation. The higher-level controller 30, with reference to the evaluation database 32*c*, the history database 32*d*, and the like, may select an operating parameter by machine learning or the like, and set a parameter value to be changed to the selected operating parameter.

In the protocol application software, the third type of supplementary operation may be added by editing the protocol. In step S6, the control unit 36 may receive the protocol modification by the third type of supplementary operation as information on the protocol modification.

The higher-level controller 30 may modify the protocol by combining the basic operation and the supplementary operation. The higher-level controller 30 may modify the protocol based on results of machine learning or the like with reference to the history database 32*d*.

Subsequently, returning to step S2, the protocol generation system S1 executes the modified protocol.

2.4 Creation of Protocol Chart

Next, Creation of the Protocol Chart in FIG. 5 Will be Described.

As the protocol creation device 1, for example, the higher-level controller 30, as an initial symbol placing means, places an initial symbol representing an initial state of a container in which a work object is accommodated.

Subsequently, the higher-level controller 30, as a sequence line placing means, places a sequence line sL indicating the work order for the container in the direction along a first axis from the initial symbol.

Subsequently, the higher-level controller 30, as a work symbol placing means, places a work symbol representing work to be done on the container along the sequence line sL. When there are multiple pieces of work to be done on one container, the work symbols representing the pieces of work are aligned along the sequence line sL.

Subsequently, the higher-level controller 30, as a separating means, places an initial symbol, a sequence line sL, and a work symbol for a different container apart in a direction along a second axis (e.g., a work line wL) intersecting the first axis.

Subsequently, the higher-level controller 30 displays, as a modification information display means and corresponding to the work symbol, modification information for at least one of the basic operation that is basic for performing the work of the work symbol and is for instruments including containers used by the robot 10 for the work or the supplementary operation that supplement the basic operation.

For example, when the work symbol illustrated in FIG. 5 is selected, the control unit 36 displays modification information for the basic operation on the output unit 33, as illustrated in FIG. 16. When the work symbol is selected, the control unit 36 displays the parameter name 44*a* and the parameter input field 44*b* on the output unit 33 as modification information for the basic operation and the supplementary operation, as illustrated in FIG. 19. When the work symbol is selected, the control unit 36 displays the parameter name 45*a* and the parameter input field 45*b* on the output unit 33 as modification information for the basic operation and the supplementary operation, as illustrated in FIG. 20.

2.5 Example of Manufacturing Object

Next, an operation example of manufacturing an object by the robot according to the protocol generated by the protocol generation system S1 by processing step S1 through step S8 will be described with reference to FIGS. 21 to 23B. Here, an example in which the object is a cell will be described.

As illustrated in FIG. 21, the robot program generation system S acquires a modified protocol (step S20). To be specific, the control unit 36 or the like of the higher-level controller 30, as the determination device 3, acquires a modified protocol closer to the optimum from the protocol database 32*b* based on the protocol ID corresponding to a predetermined product. The control unit 36, as the protocol creation device 1, may transmit the modified protocol read from the protocol database 32*b* to the determination device 3.

Subsequently, the robot program generation system S acquires information on an allowable range in which the modified protocol can be changed (step S21). To be specific, the control unit 36 or the like, as the determination device 3, with reference to the allowable range database 32e, acquires information on the allowable range based on the robot ID or the like of the robot that manufactures the object. To be more specific, the determination device 3 acquires information on the allowable ranges for information on specifications of the robot that manufactures the object, the use of the object, delivery date and quantity of the object, the importance of the work in the protocol, and the value corresponding to the evaluation criterion. The control unit 36, as the protocol creation device 1, may transmit the information on the allowable range read from the allowable range database 32e to the determination device 3.

Subsequently, the robot program generation system S determines whether the modified protocol can be converted for another robot without modification (step S22). To be specific, the control unit 36 or the like, as the determination device 3, determines whether each work and each operation in the protocol can be performed based on the information on the specifications or the like of the robot that manufactures the object, which is the information on the allowable range.

Thus, the higher-level controller 30 functions as an example of the determination unit that determines whether the modified protocol can be converted into the second program in accordance with the modified protocol.

Here, determination whether the modified protocol can be converted for another robot such as the robot 10B, the robot 10C, or the robot 10D will be described. Even the robot of the same type as the robot 10 cannot be executed when, for example, an available equipment configuration is different, it may be determined that the conversion is impossible. Even another type of robot determined to be able to be executed cannot be executed when, for example, an available equipment configuration is different, and it may be determined that the conversion is impossible.

First, as illustrated in FIG. 8, the determination whether conversion is possible will be described using an example of the work including the operation of changing the tilt of the tip T of the pipette and tilting the well W of the microplate.

The single-arm six-axis robot 10C can hold the pipette, but cannot tilt the microplate, so the microplate remains in place, and cannot achieve the optimal parameter for the angle of the microplate. Therefore, it is determined that the conversion is impossible.

The Cartesian coordinate robot 10D cannot tilt either the pipette or the microplate. Therefore, it is determined that the conversion is impossible.

The dual-arm six-axis robot 10B to which the conversion is applied can tilt both the pipette and the microplate, and it is determined that the conversion is possible. However, when the robot motion accuracy is required and the motion cannot be reproduced with a six-axis robot, it is determined that the conversion is impossible.

When even the robot of the same type as the robot 10 has a different equipment configuration and insufficient pipette capacity, it may be determined that the conversion is impossible.

Next, the determination whether conversion is possible will be described using an example of the work including the operation of swinging the microplate in an arc shape as illustrated in FIG. 10 and the operation of swinging the microplate horizontally in a figure-eight pattern as illustrated in FIG. 11.

The single-arm six-axis robot 10C can perform operation of swinging the microplate in an arc shape and operation of swinging the microplate horizontally in a figure-eight pattern, and it is determined that the conversion is possible.

In the case of the Cartesian coordinate robot 10D, the operation of swinging the microplate in an arc shape is determined to be inconvertible, and the operation of swinging the microplate horizontally in a figure-eight pattern is determined to be convertible.

For the dual-arm six-axis robot 10B to which the conversion, it is determined that the conversion is possible.

Next, the determination whether conversion is possible will be described using an example of the work including operation of changing the tilt of the tip T while the well W is placed horizontally as illustrated in FIG. 22.

Since the single-arm six-axis robot 10C can change the tilt of the tip T while leaving the microplate with the wells W in place, it is determined that the conversion is possible.

Since the Cartesian coordinate robot 10D cannot change the tilt of the tip T of the pipette, it is determined that the conversion is impossible.

Since the dual-arm six-axis robot 10B can perform this operation, it is determined that the conversion is possible.

Next, the determination whether conversion is possible will be described using an example of work including operation of pipetting with the well W horizontal and the tip T vertical as illustrated in FIGS. 23A and 23B.

Since the dual-arm six-axis robot 10B, the single-arm six-axis robot 10C, and the Cartesian coordinate robot 10D can perform this operation, it is determined that the conversion is possible.

Next, the determination whether conversion is possible will be described using an example of work including operation of scraping cells from a dish by coordinating the dish and a spatula.

The single-arm six-axis robot 10C can hold the spatula but cannot hold the dish, so the dish remains in place. Therefore, it is impossible to achieve an optimal scraping motion with the spatula and the dish coordinated, resulting in longer scraping time. Therefore, when the scraping time is longer than or equal to a predetermined value, the damage to the cells is large, and it is determined that the conversion is impossible.

Since the Cartesian coordinate robot 10D cannot perform this operation, it is determined that the conversion is impossible.

Since the dual-arm six-axis robot 10B can perform this operation, it is determined that the conversion is possible.

Next, the determination whether conversion is possible will be described using an example of work including operation of dispensing by moving a pipette up and down while holding the pipette vertically.

Since the dual-arm six-axis robot 10B, the single-arm six-axis robot 10C, and the Cartesian coordinate robot 10D can perform this operation, it is determined that the conversion is possible.

If it is determined that the modified protocol cannot be converted for another robot (step S22; NO), the robot program generation system S determines whether the requirement is within an allowable range (step S23). To be specific, the control unit 36 or the like, as the determination device 3, determines whether the requirement is within the allowable range in which the modified protocol can be changed based on information on the object to be manufactured, information on the allowable range for the robot that manufactures the object, and the like.

For example, when a percentage viability of 75% or more is required, the determination device 3, with reference to the allowable range database 32e, determines that the requirement is within the allowable range for the robot 10B with Viability 90%, determines that the requirement is within the allowable range for the robot 10C with Viability 80%, and determines that the requirement is out of the allowable range for the robot 10D with Viability 50%.

When there is no need to proliferate cells urgently and a period of 10 days is required for the cells to double, the determination device 3 determines that the requirement is within the allowable range for the dual-arm six-axis robot 10B, the single-arm six-axis robot 10C, and the Cartesian coordinate robot 10D.

When, for example, a more advanced product is required and the high difficulty level A is required as the difficulty level for work, for example, the determination device 3 determines that the requirement is within the allowable range for the dual-arm six-axis robot 10B, is out of the allowable range for the single-arm six-axis robot 10C, and is out of the allowable range for the Cartesian coordinate robot 10D.

When the medium difficulty level B is required as the difficulty level for work, for example, the determination device 3 determines that the requirement is within the allowable range for the dual-arm six-axis robot 10B, is within the allowable range for the single-arm six-axis robot 10C, and is out of the allowable range for the Cartesian coordinate robot 10D.

When, for example, there is no urgency and the low difficulty level C is required as the difficulty level for work, for example, the determination device 3 determines that the requirement is within the allowable range for the dual-arm six-axis robot 10B, is within the allowable range for the single-arm six-axis robot 10C, and is within the allowable range for the Cartesian coordinate robot 10D.

Here, in the discharge operation of discharging the medium m to loosen the cells c, as illustrated in FIG. 9B, the operation of discharging from the tilted tip T along the wall of the well W while changing the position of the tip T with the well W tilted is operation with the difficulty level A. As illustrated in FIG. 22, operation of discharging the medium m from the tip T onto the cells c near the wall of the well W while the tip T is tilted is operation with the difficulty level B. As illustrated in FIGS. 23A and 23B, operation of discharging the medium m from the tip T without tilting the tip T is operation with the difficulty level C.

Thus, the higher-level controller 30 functions as an example of the determination unit that makes a determination in accordance with the allowable range in which the modified protocol can be changed.

If it is determined that the modified protocol can be converted for another robot (step S22; YES), the robot program generation system S converts the protocol into a robot program (step S24). To be specific, the control unit 36 or the like, as the conversion device 2, converts the protocol into a robot program for the robot 10 that manufactures the object, the conversion device 4B converts the protocol into a robot program for the robot 10B that manufactures the object, the conversion device 4C converts the protocol into a robot program for the robot 10C that manufactures the object, and the conversion device 4D converts the protocol into a robot program for the robot 10D that manufactures the object.

If the requirement is within the allowable range (step S23; YES), the robot program generation system S converts the modified protocol into a robot program (step S24). To be specific, the control unit 36 or the like, as each of the conversion devices 4B, 4C, and 4D of the conversion device 4, converts the modified protocol into a robot program for each of the robots 10B, 10C, and 10D by changing some operation and work within the allowable range.

For example, when the protocol includes operation with the difficulty level A, but the difficulty level C is allowed, the control unit 36 or the like changes the operation with the difficulty level A in the protocol to operation with the difficulty level C for the robot 10C or the like. When a predetermined operation with the difficulty level A in the protocol achieves a percentage viability of 90% or more as the evaluation criterion, but a percentage viability of 75% or more is required, the control unit 36 or the like changes the operation with the difficulty level A in the protocol to operation with the difficulty level B or the like for the robot 10B or the like. When rapid cell proliferation, which can only be achieved by the robot 10, is not required, the protocol is converted into a robot program for the robot 10D or the like.

The control unit 36, as the protocol creation device 1, may provide the modified protocol or the protocol partially changed for each of the robots 10B, 10C, and 10D to each of the conversion devices 4B, 4C, and 4D through a network line or through a recording medium such as a CD-ROM. Alternatively, the control unit 36, as the protocol creation device 1, may provide the robot program converted for each of the robots 10B, 10C, and 10D to each of the robots 10B, 10C, and 10D through a network line or through a recording medium such as a CD-ROM.

Thus, the higher-level controller 30 or the like functions as an example of the second conversion unit that converts the modified protocol into a second program that can be executed by a second robot different from the first robot. Further, the higher-level controller 30 or the like functions as an example of the second conversion unit that converts the modified protocol into the second robot program within the allowable range.

In the case of the operation illustrated in FIGS. 8 to 9B, the conversion device 4C converts the modified protocol into a robot program for the robot 10C in which the operation illustrated in FIG. 22 is used as a substitute. In this case, the conversion device 4C may directly convert a protocol including operation that cannot be executed as it is into a robot program for the robot 10C that can be executed by the robot 10C. Alternatively, the protocol creation device 1 or the determination device 3 may change the protocol itself by replacing or changing some operation so that the robot 10C can execute the changed protocol.

In the case of the operation illustrated in FIGS. 8 to 9B, the conversion device 4D converts the protocol into a robot program in which the operation illustrated in FIGS. 23A to 23B is used as a substitute. In this case, the conversion device 4D may directly convert a protocol including operation that cannot be executed as it is into a robot program for the robot 10D that can be executed by the robot 10D, or the protocol creation device 1 or the determination device 3 may change the protocol itself for the robot 10D.

Subsequently, the robot program generation system S manufactures the object (step S25). To be specific, according to the generated robot program, the robot 10, 10B, 10C, 10D, or the like manufactures the object. In the case of the robot 10, the robot 10 may manufacture the object with the processing in step S21 and step S22 omitted.

To be more specific, based on motion commands from the higher-level controller 30 or the like, the robot 10, 10B, 10C, 10D, or the like sequentially executes a series of protocols such as a protocol for seeding cells, a protocol for replacing a medium, a protocol for checking cells, and a protocol for passaging cells, to manufacture cells. The robot 10, 10B, 10C, 10D, or the like manufactures cells by sequentially executing the modified protocols under the control of the higher-level controller 30 or the like. According to the modified protocol with some changes within the allowable range, the robot 10B, 10C, or 10D may manufacture cells.

In the process of the cell culture p3, the robot 10, 10B, 10C, 10D, or the like manufactures cells by sequentially executing protocols such as the protocol for seeding cells, the protocol for replacing a medium, the protocol for checking cells, and the protocol for passaging cells.

From the shipment arrival p1 to the shipment p7, cells are manufactured by the robot 10, 10B, 10C, 10D, or the like according to the series of protocols for the respective processes and shipped.

If the requirement is not within the allowable range (step S23; NO), the robot program generation system S determines that the target robot cannot execute the protocol and does not allow the target robot to manufacture the object. To be specific, the control unit 36 or the like of the higher-level controller 30, as the determination device 3, does not allow the robot 10, 10B, 10C, 10D, or the like to manufacture the object.

Even if it is determined, in step S22, that the modified protocol can be converted for another robot, it is determined that the robot cannot execute the modified protocol if the requirement is out of the allowable range.

As described above, according to the present embodiment, the robot 10, 10B, 10C, 10D, or the like operates with a protocol modified by the modification information for at least one of the basic operation or the supplementary operation to perform more efficient work and manufacture the object in the field of biological engineering, allowing stable and high-yield cell culture and the like to be performed and productivity in manufacture of the object to be increased.

In determining whether the modified protocol can be converted into the second program in accordance with the modified protocol, the robot program can be provided only for a robot that can work according to the modified protocol.

In determining whether the modified protocol can be converted into the second program based on the allowable range in which the modified protocol can be changed, even when the work cannot be converted as it is for another robot, the modified protocol can be used for another robot 10B, 10C, 10D or the like due to allowable range, increasing the types of robots that can manufacture and further increasing productivity.

In converting the modified protocol into the second robot program within the allowable range, even when the work cannot be converted as it is for another robot, the modified protocol can be used for another robot within the allowable range, further increasing productivity by making it possible to manufacture with another robot as well.

When the allowable range of change is set by at least one of the evaluation criteria for evaluating the results of multiple pieces of work, the type of object to be manufactured, or the difficulty level for the work, the allowable range for the change is specifically set by the evaluation criteria, the type of object, or the difficulty level for the work.

When the modification information for the basic operation includes change information of the parameter value of the basic operating parameter in the basic operation, the basic operation is improved by the parameter, and the robot 10 or the like operates with the modified protocol to perform the more efficient work and manufacture the object, allowing stable and high-yield cell culture or the like to be performed and productivity in manufacture of the object to be increased.

When the modification information for the supplementary operation includes additional information on the supplementary operation to be added in performing multiple pieces of work, the basic operation is improved by the parameter, and the added supplementary operation allows the robot 10 or the like to operate with the modified protocol to perform the more efficient work and manufacture the object, allowing stable and high-yield cell culture or the like to be performed and productivity in manufacture of the object to be increased.

When the modification information for the supplementary operation is second change information to change a value set as unchanged in response to the basic operation in the code of the first program, more efficient work can possibly be achieved.

In displaying a supplementary operation input screen on the display unit that includes items representing supplementary operation and receives input for supplementary operation, the supplementary operation can be selected, and thus the protocol can be modified more easily.

When the multiple pieces of work in cell manufacture include work for processing cell cultures, productivity in manufacture of the cell culture can be increased.

In obtaining evaluation information obtained by evaluating the results of multiple pieces of work performed and generating modification information based on the evaluation information, the performance of the pieces of work according to the protocol can be verified.

3. Manufacture of Processed Product in Second Embodiment

Second Embodiment

Next, manufacture and the like of a processed product according to a second embodiment, in which the object is the processed product, will be described with reference to the figures. The same reference signs are used for configurations and pieces of operation that are the same as or correspond to those of the first embodiment, and only different configurations and pieces of operation will be described. The same applies to other embodiments and modifications.

3.1 Protocol Chart in Second Embodiment

A protocol chart in the second embodiment will be described with reference to the figures. FIGS. 24A and 24B are schematic diagrams illustrating examples of protocol charts. The protocol chart describes a series of pieces of work for an object to be processed.

The protocol chart illustrated in FIG. 24A includes an initial symbol indicating an initial state of a container accommodating a work object or an object to be processed, a final symbol indicating a final state of this container, and work symbols indicating individual pieces of work on the container along a sequence line sL from the initial symbol to the final symbol.

First, in the protocol chart, an initial symbol written as "Tube1.5" written at the top indicates an initial state of a container such as a microtube e3. An initial symbol written as "Tube1.5" indicates an initial state of a container such as a microtube e3. "Main rack" written in the initial symbol indicates an instrument such as a tube rack e9 in which the container such as the microtubes e3 is accommodated.

Here, the initial symbol "Tube1.5" corresponds to work wk11 for taking out the microtube e3 from the tube rack e9, which is a main rack.

A final symbol written as "Tube1.5" indicates a final state of the container such as the microtube e3. "Main rack"

written in the final symbol indicates the instrument such as the tube rack e9 used for storing the container such as the microtube e3 after completion of work of the protocol.

Here, the final symbol "Tube1.5" corresponds to work wk22 for returning the microtube e3 that work has done to the tube rack e9.

When work on the container indicates a change in an amount stored in the container, a work symbol indicating the work is placed at a position spaced apart from the sequence line sL in a second axial direction. For example, a work symbol written as "ADD" meaning addition and the sequence line sL are connected by a work line wL in the second axial direction. This work line wL is a line with an arrow pointing towards the sequence line sL to clearly indicate that the work is an addition to the container. However, a method of describing a direction is not limited, and the work line wL may be a simple straight line without an arrow. Further, a work symbol written as "DISCARD" meaning discard and the sequence line sL are connected by a work line wL in the second axial direction. This work line wL is a line with an arrow pointing away from the sequence line sL to clearly indicate that some or all of the contents in the container are to be discarded.

The work symbol "ADD" indicates, as conditions, a reagent to be added, in this case "Reagent A", such as chloroform, isopropanol, or ethanol, and an amount to be added. Pieces of work corresponding to the work symbol "ADD" are indicated by work wk14 and work wk18. The work symbol "DISCARD" indicates, as conditions, a contained object to be discarded, in this case "Supernatant", and an amount to be discarded. Here, when the amount to be discarded is indicated by a symbol "--", the symbol "--" means, for example, to discard all or as much of the supernatant as possible. As illustrated in FIG. 24A, pieces of work corresponding to the work symbol "DISCARD" are indicated by work wk17 and work wk21.

When work on the container does not indicate a change in an amount stored in the container, a work symbol indicating this work is placed on the sequence line sL.

For example, a work symbol "MIX" indicates work of agitating the contents. The work symbol "MIX" indicates, as conditions, an agitation method (an instrument used for agitation), a temperature, and an agitation time. Here, examples of the agitation method include a method of agitating with a vortex mixer such as a mixer e4, a method of agitating by pipetting with a dispenser e1, and a method of agitating with a microplate mixer. The work with the work symbol "MIX" corresponds to work wk12, work wk15, and work wk19. A work symbol "CENTRIFUGE" represents work of centrifuging the microtube e3. The work symbol "CENTRIFUGE" indicates, as conditions, a strength of centrifugal force and a centrifugation time. In the work symbol "CENTRIFUGE", the microtube e3 is placed in a centrifuge e5 and centrifuged at 12000 G for 15 seconds. The work with the work symbol "CENTRIFUGE" corresponds to work wk13, work wk16, and work wk20.

As illustrated in FIG. 24B, when work is transferred between containers, a work symbol (e.g., a work symbol "TRANSFER") is placed between a sequence line sL for a source container and a sequence line sL for a destination container on a screen 50B. Further, a work line wL is placed along the second axial direction from the sequence line sL to the sequence line sL. Some or all of the contents of a container "Tube50" are transferred from the container "Tube50" to a container "XXXXX". Here, a line with an arrow is used as the work line indicating a transfer direction.

Of course, the description method for indicating the transfer direction is not limited to a line with an arrow, and any other method may be used.

Next, work and operation included in the work will be described with reference to the figures.

As illustrated in FIG. 24A, the pieces of work corresponding to the work symbols, the initial symbol, the final symbol, and the like shown in the protocol chart are work units.

For example, in the discard work wk21, as illustrated in FIGS. 25A and 25B, an insertion operation is performed to insert a tip T attached to an aspirator into the microtube e3 after centrifugation to a predetermined height h on the opposite side of precipitate prc, and as illustrated in FIG. 25C, a tilting operation is performed to tilt the microtube e3 and the tip T to a predetermined angle F, and an aspiration operation is performed to aspirate supernatant liquid sp from the microtube e3. The operation performed by a robot 10 on instruments such as the microtube e3 and the aspirator correspond to so-called hand techniques.

As illustrated in FIG. 26, these pieces of operation have basic operating parameters such as an insertion position d of the tip T, the height h of the tip T during aspiration, and the tilt angle F of the microtube e3.

In the case of the work wk11 of taking out the microtube e3 from the tube rack e9, operation of taking out the microtube e3 from the tube rack e9 and the like are the basic operation.

In the case of the work wk12, the work wk15, and the work wk19 of agitating the microtube e3, operation of moving the microtube e3 to the mixer e4, operation of placing the microtube e3 on the mixer e4, and the like are the basic operation, and a rotation speed of the mixer e4, placement time, and the like are the basic operating parameters.

In the case of the work wk14 and the work wk18 for addition, operation of grasping the dispenser e1, operation of attaching the tip T to a tip of the dispenser e1, operation of moving the dispenser e1 to a reagent bottle, operation of aspirating liquid to be added from the reagent bottle, operation of grasping the microtube e3, operation of discharging a predetermined amount of liquid into the microtube e3, and the like are the basic operation, and an amount of liquid to be discharged, a discharge speed, and the like are the basic operating parameters.

In the case of the work wk16 and the work wk20 of centrifuging the microtube e3, operation of opening a lid of the centrifuge e5, operation of setting the microtube e3 in the centrifuge e5, operation of closing the lid of the centrifuge e5, operation of switching on the centrifuge e5 and waiting, operation of switching off the centrifuge e5 and taking out the microtube e3, and the like are the basic operation, and a centrifugal strength, a centrifugal time, and the like are the basic operating parameters.

In the case of the work wk17 and the work wk21 of discarding the supernatant from the microtube e3, operation of inserting a tip of the aspirator into the microtube e3, operation of tilting the microtube e3, and operation of aspirating with the aspirator, and the like are the basic operation. An insertion position of the tip T at the tip of the aspirator, a height of the tip T during aspiration, a tilt angle of the microtube e3, a waiting time after tilt, an aspiration speed, a frequency of replacing the tip T, and the like are the basic operating parameters.

In the case of the work of taking out the microplate e2 from the incubator e6, operation of opening a door of the incubator e6, operation of taking out the microplate e2 from the incubator e6, operation of closing the door of the incubator e6, and the like are the basic operation.

In the case of the work of agitating the microplate e2, operation of moving the microplate e2 to the microplate mixer, operation of placing the microplate e2 on the microplate mixer, and the like are the basic operation, and a rotation speed of the microplate mixer, placement time, and the like are the basic operating parameters.

Next, a first type of supplementary operation, a second type of supplementary operation, and a third type of supplementary operation in the second embodiment will be described with reference to the figures in the case of the processed product.

The first type of supplementary operation is, for example, operation of changing a tilt of the tip T relative to the microtube e3 as illustrated in FIG. 27, in an aspiration operation of aspirating the supernatant liquid sp after centrifugation as illustrated in FIG. 25C. As illustrated in FIG. 27, the first type of supplementary operation may be operation of changing the tilt of the tip T relative to the microtube e3 and aspirating with the aspirator. This first type of supplementary operation is added to the work or is replaced with other operation, thus modifying the protocol. The first type of supplementary operation is an example of a supplementary operation that is added when performing work. The first type of supplementary operation is an example of a supplementary operation generated by changing a fixed value.

A relative angle between the microtube e3 and the tip T is set to an angle (e.g., f [degrees]) to achieve operation of aspirating the supernatant liquid sp as quickly as possible while avoiding aspiration of the precipitate prc and leaving the precipitate prc. The relative angle between the microtube e3 and the tip T may be newly set as a supplementary operating parameter.

Next, a modification of the protocol by the second type of supplementary operation will be described.

For example, in the aspiration operation as illustrated in FIG. 27, in which the supernatant liquid sp is aspirated as quickly as possible while avoiding aspiration of the precipitate prc, which is a product, even when the relative angle between the microtube e3 and the tip T is changed, productivity improvement of the work of increasing a collection rate of the precipitate prc and quickly discharging the supernatant liquid sp may reach the limit thereof.

However, as illustrated in FIGS. 28A and 28B, tilting the microtube e3 such that the supernatant liquid sp flows down and moving the tip T away from a bottom of the microtube e3 along an inner wall of the microtube e3 while tilting the microtube e3 according to the flow of the supernatant liquid sp allows the collection rate to be increased by reducing a possibility of accidental aspiration of the precipitate prc, contamination of impurities to be reduced by discarding as much supernatant liquid sp as possible, the aspiration speed to be improved, and productivity to be increased. Instead of the operation of aspirating the supernatant liquid sp as illustrated in FIG. 27, a supplementary operation of aspirating the supernatant liquid sp with the aspirator while tilting the microtube e3 such that the supernatant liquid sp flows down as illustrated in FIG. 28A from a state illustrated in FIG. 27, and a supplementary operation of retracting the tip T from the bottom of the microtube e3 while aspirating the supernatant liquid sp with the aspirator as illustrated in FIG. 28B, are newly added to the work.

An operation illustrated in FIG. 29 and operation illustrated in FIG. 30 are the second type of supplementary operation. Regarding the agitation work for the work symbol "MIX" or the like, when the operation of placing the microtube e3 on the mixer e4 such as a vortex mixer is the basic operation, the operation illustrated in FIG. 29 is the second type of supplementary operation. Regarding the discarding work, when the operation of discarding the supernatant liquid after the centrifugation work is the basic operation, operation of collecting products such as DNA or RNA using magnetic beads is the second type of supplementary operation.

As illustrated in FIG. 29, operation of reversing the microtube e3, stopping the hand 14 relative to the arm 13 for predetermined time t [s], and returning to an original angle n times with the microtube e3 or the like whose lid is closed grasped is the second type of supplementary operation. This will achieve agitation that uses gravity to move the precipitate from the bottom of the microtube e3.

As illustrated in FIG. 30, operation in which antibody-bound magnetic beads are put into the microtube e3 or the like, a magnet mm is brought into contact with a side surface of the microtube e3 to collect a processed product pm, and the liquid is aspirated with the aspirator is the second type of supplementary operation.

The information on the basic operation is information on basic operating parameters, for example, in the case of "DISCARD" of the work wk21 of the protocol, such as the insertion position of the tip T, the height of the tip T during aspiration, the tilt angle of the microtube e3, the waiting time after tilt, the aspiration speed, the frequency of replacing the tip T, and the like. The information on the first type of supplementary operation is, for example, information on a fixed value that can be converted into a variable, such as the relative angle between the microtube e3 and the tip T during aspiration.

3.2 Manufacturing Process of Processed Product

Next, the manufacturing process of the processed product will be described with reference to FIG. 31. FIG. 31 is a block diagram illustrating an example of a manufacturing process for a processed product according to the embodiment. The manufacturing process will be described using manufacturing of processed products in genomics as an example.

As illustrated in FIG. 31, the manufacturing process of the processed product includes shipment arrival p11, receiving inspection p12, nucleic acid extraction p13, library preparation p14, inspection p15, storage p16, delivery inspection p17, and shipment p18.

In the process of the shipment arrival p11, IDs such as a processing object ID of the object to be processed and a type ID of the object to be processed of an arrived specimen or the like are assigned. The specimen is part of a biological component such as a biological tissue and cell, or nucleic acid and protein and metabolite derived therefrom. Types of the specimen include blood, somatic cells, germ cells, tumor cells, cancer cells, oral and digestive mucosa, saliva, sputum, urine, stool, sweat, ascites, and spinal fluid. The object to be processed may be, for example, bacteria, viruses, tissues derived from plant cells, seawater, river water, soil, or the like containing such as nucleic acids, proteins, and metabolites. Arrived objects to be processed may be preserved specimens, starting materials for drugs and reagents, or raw materials.

In the process of the receiving inspection p12, when the object to be processed such as the specimen arrives in a frozen state, the object to be processed is thawed and inspected. For example, a predetermined inspection is performed on the arrived specimen. A higher-level controller 30 transmits a motion command to a robot controller 20 so as to execute a protocol of receiving inspection. Under control of the robot controller 20, the robot 10 inspects the arrived object to be processed according to the protocol of receiving inspection. A person may inspect the object to be processed and the higher-level controller 30 may receive inspection results.

Protocols for executing the process of the nucleic acid extraction p13 include (1) a protocol for preparing the arrived sample in the microtube, (2) a protocol for precipitating and concentrating DNA, RNA, or the like, and (3) a protocol for dissolving and collecting the precipitated DNA, RNA, or the like. The higher-level controller 30 transmits a motion command to the robot controller 20 so as to execute these protocols in order. Under the control of the robot controller 20, the robot 10 performs pieces of work in the respective protocols for the nucleic acid extraction.

Here, the protocol for preparing the arrived sample in the microtube is, for example, a protocol in which the specimen is washed with sterile distilled water, the specimen is destroyed (dissolved) using ultrasound, enzymes, or the like, a processing solution for pretreatment of the specimen is prepared, and an appropriate amount of the processing solution is fed into the microtube e3. The processing solution may be diluted or concentrated before feeding the processing solution into the microtube e3.

The protocol for precipitating and collecting DNA, RNA, or the like is, for example, a protocol for concentrating DNA, RNA, or the like by adding a reagent such as chloroform, isopropanol, ethanol, or the like to the microtube e3 into which the processing solution for preprocessing the specimen is fed to precipitate DNA, RNA, or the like, centrifuging with the centrifuge e5, and discarding the supernatant liquid.

The protocol for dissolving and collecting the precipitated DNA or RNA is, for example, a protocol in which a reagent for dissolving the precipitate is fed, the precipitate is dissolved by agitation, and the dissolved DNA, RNA, or the like is collected.

In the process of the library preparation p14, DNA, RNA, or the like is fragmented, terminals thereof are repaired, adapters are bound thereto, and the like. According to a protocol of library preparation, the robot 10 adds a necessary reagent to the extracted DNA, RNA, or the like, and performs procedures such as agitation and centrifugation to prepare a library to be applied to a sequencer.

In the process of the inspection p15, a yield of the processed product, presence or absence of impurities in the processed product, a fragment length of the processed product, a denaturation rate of the processed product, and the like are inspected. According to a protocol of inspection, the robot 10 inspects the manufactured processed product. The higher-level controller 30 transmits a motion command to the robot controller 20 so as to execute the protocol of inspection. Under the control of the robot controller 20, the robot 10 inspects the manufactured processed product according to the protocol of inspection. A person may inspect the manufactured processed product and the higher-level controller 30 may receive inspection results.

After the process of collecting the nucleic acids, in addition to the library preparation process, for example, a process of preparing cDNA using RNA as a template may be performed. In this case, in order to synthesize cDNA using a reverse transcriptase, in a process of performing RT-PCR, the robot 10 may put an appropriate amount of cDNA, primers, and reverse transcriptase into a well for PCR and set the well in a PCR machine.

In the process of the storage p16, as in the storage p5, for example, the manufactured processed product is placed in a cryotube or the like containing a medium containing a cryoprotectant, frozen at −80° C., and stored in a liquid nitrogen container.

In the process of the delivery inspection p17, as in the process of the delivery inspection p6, the cryotube is taken out and partially thawed, and the processed product is inspected before shipping.

In the process of the shipment p18, as in the shipment p7, the cryotubes to be shipped are packed in a bag or the like for cold storage and shipped.

In the case of proteomics, the manufacturing of the processed product is performed, for example, in the following process order of shipment arrival, receiving inspection, protein extraction, inspection, fragmentation, inspection, storage, delivery inspection, and shipment. The storage process may be omitted, and the manufactured protein may be shipped immediately after manufacture. In the case of metabolomics, the manufacturing of the processed product is performed, for example, in the following process order of shipment arrival, receiving inspection, metabolite extraction, inspection, storage, delivery inspection, and shipment.

3.3 Operation Example of Generating Modified Protocol in Second Embodiment

Next, an operation example of generating a modified protocol in the second embodiment will be described with reference to the figures. For protocol charts for nucleic acid extraction, in particular, using an example of a protocol chart for a process of precipitating and collecting RNA, operation of manufacturing a processed product by optimizing a protocol as much as possible will be explained.

As in step S1, a protocol generation system S1 of a robot program generation system S acquires a protocol. To be specific, the higher-level controller 30, with reference to a protocol database 32b, acquires information on the protocol. For example, information on a protocol chart such as the one illustrated in FIG. 24A for the process of precipitating and collecting RNA in the process of nucleic acid extraction p13 is acquired. In the case of input by a person, as illustrated in FIG. 24A, a "File" button is clicked by an input unit 34 on the screen 50A, a protocol for the RNA precipitation process is selected from a pull-down menu, and a protocol chart is read from the protocol database 32b. The higher-level controller 30 may acquire the protocol from an external server device via a network.

The higher-level controller 30 may receive input of a protocol from the input unit 34, a terminal device, or the like. In receiving human input, as illustrated in FIG. 24A, on the screen 50A, the "File" button is clicked using the input unit 34, a list of protocols is displayed from an "Open" menu, and a protocol to be executed is selected.

Subsequently, as in step S2, the protocol generation system S1 converts the protocol into a robot program.

Subsequently, as in step S3, the protocol generation system S1 executes the robot program.

The robot 10 performs a series of pieces of work from the work wk11 to the work wk22 in the protocol chart. The robot 10 also executes other series of protocols.

Subsequently, as in step S4, the protocol generation system S1 evaluates performance results.

For example, in the case of RNA extraction, as results of performance, errors in aspiration of precipitate, a yield of the precipitate, an amount of impurities mixed in, work times for the respective pieces of work such as wk11, and the like are measured from images and measurement date in the microtube e3. The error in aspiration of precipitate is determined by, for example, machine learning of video images of the operation. In determining the performance result from an image, measurement is performed by comparison with a feature of an image or the like, matching with a template image, machine learning, or the like.

The higher-level controller 30 executes a protocol of evaluation, and for example, the robot 10 takes out a portion of the processed product, measures this portion using a measuring instrument such as a mass spectrometer or an NMR apparatus, and acquires a measurement result from the measuring instrument.

Subsequently, as in step S5, the protocol generation system S1 determines whether the value is greater than or equal to a predetermined value. For example, as illustrated in FIG. 32, a control unit 36 determines whether a comprehensive evaluation combining a yield of the precipitate such as RNA, an amount of impurities mixed in, a time required for the work, and the like is greater than or equal to a predetermined value.

If the evaluation of the performance result is greater than or equal to the predetermined value, the protocol generation system S1 outputs a modified protocol, as in step S8.

If the evaluation of the performance result is not greater than or equal to the predetermined value, the protocol generation system S1 acquires information on the protocol modification, as in step S6.

In the case of the basic operation, on the screen 50A as illustrated in FIG. 24A, a menu "Edit" for protocol editing may be selected and "DISCARD" of the work wk17 or the work wk21 may be clicked, and an input screen 52 for changing the values of the basic operating parameters may be displayed on an output unit 33, as illustrated in FIG. 33. The higher-level controller 30 may receive input for changing the basic operating parameter from the input screen 52 as the information on the protocol modification.

Subsequently, the protocol generation system S1 modifies the protocol as in step S7.

3.4 Subroutine for Modifying Protocol in Second Embodiment

Next, the subroutine for modifying a protocol will be described with reference to the figures.

The protocol generation system S1 determines whether the basic operation is to be modified, as in step S10.

If the basic operation is to be modified, the protocol generation system S1 modifies the basic operation as in step S11.

As illustrated in FIG. 33, tip exchange, a height of a tip of the tip T during aspiration, a waiting time, and the like are examples of the values of the basic operating parameters.

Alternatively, the higher-level controller 30 may select the basic operating parameter to be changed based on the evaluation result and change the value of the basic operating parameter. For example, when the amount of impurities contained in the processed product is high in the evaluation in step S4, the higher-level controller 30 lowers the height h of the tip end during discharge. When a collection rate of the processed product is low, the higher-level controller 30 extends the waiting time.

As illustrated in FIG. 34, the higher-level controller 30, with reference to an evaluation database 32c, a history database 32d, and the like, may display a "Suggestion" screen 53 displayed on the output unit 33.

In step S6, the control unit 36 of the higher-level controller 30 displays the input screen 52 as illustrated in FIG. 34 as the information on the protocol modification, and simply receives a change of the basic operating parameter from the input screen 52. The higher-level controller 30 may then change the value of the basic operating parameter and generate a protocol based on the changed basic operating parameter. For example, the item of the tip end height is selected, and a protocol is generated in which the height is changed from "4 [mm]" to "5 [mm]".

If the basic operation is not to be modified (step S10; NO), the protocol generation system S1 modifies the protocol by the supplementary operation, as in step S12.

The control unit 36 adds the first type of supplementary operation to the protocol for changing the relative angle between the microtube e3 and the tip T, as illustrated in FIG. 27. For example, the control unit 36 inserts the first type of supplementary operation in which the relative angle between the microtube e3 and the tip T is changed as illustrated in FIG. 27 into the operation of "DISCARD" of the work wk17 or the work wk21 of the protocol.

Protocol application software that, for example, edits and executes the protocol may be modified so that the input screen 54 illustrated in FIG. 35 can be displayed. The input screen 54 includes, as an example of an item display representing the supplementary operation, a parameter name 54a for a parameter corresponding to the first type of supplementary operation and a parameter input field 54b for the parameter corresponding to the first type of supplementary operation.

In step S6, the control unit 36 may display the input screen 54 on the output unit 33 and receive the protocol modification by the first type of supplementary operation from the input field 54b as the information on the protocol modification.

As illustrated in FIGS. 28A and 28B, the control unit 36 adds the second type of supplementary operation to the work of the protocol, in which the supernatant liquid sp is aspirated with the aspirator while tilting the microtube e3 such that the supernatant liquid sp flows down and the tip T attached to the tip of the aspirator is retracted. Alternatively, as illustrated in FIG. 29 or 30, the control unit 36 adds or replaces the second type of supplementary operation of moving the microtube e3 in the work of the protocol.

In the case of the second type of supplementary operation as illustrated in FIG. 28B, the protocol application software may be modified so that an input screen 55 as illustrated in FIG. 36 can be displayed. The input screen 55 includes, as an example of an item display representing the supplementary operation, a parameter name 55a for a parameter corresponding to the second type of supplementary operation and a parameter input field 55b for the parameter corresponding to the second type of supplementary operation. The display of the name 55a and the parameter input field 55b may be emphasized so that it can be distinguished from the basic operation and recognized as the supplementary operation.

As illustrated in FIG. 36, new hand techniques such as the second type of supplementary operation are given specific names and made selectable from the protocol application software. For example, the control unit 36 controls the display so that a new operation of "hand technique for tip retraction" can be displayed on a "Parameter of DISCARD" page that is displayed by clicking the work wk21 in the protocol chart. The name of the new operation may be a simple identification name or the name of the originator.

Subsequently, returning to step S2, the protocol generation system S1 executes the modified protocol.

3.5 Creation of Protocol Chart in Second Embodiment

Next, Creation of the Protocol Charts in FIGS. 24A and 24B Will be Described.

When, for example, the work symbol illustrated in FIG. 24A is selected as a modification information display means, the control unit 36 displays the modification information for the basic operation on the output unit 33 as illustrated in FIG. 33. When the work symbol is selected, the control unit 36 displays the parameter names 54*a* and the parameter input fields 54*b* on the output unit 33 as modification information for the basic operation and the supplementary operation, as illustrated in FIG. 35. When the work symbol is selected, the control unit 36 displays the parameter names 55*a* and the parameter input fields 55*b* on the output unit 33 as modification information for the basic operation and the supplementary operation, as illustrated in FIG. 36.

3.6 Operation Example of Manufacturing Processed Product

Next, an operation example of manufacturing a processed product by the robot, which is an example of an object, according to the protocol generated by the protocol generation system S1 will be described.

As in step S20, the robot program generation system S acquires a modified protocol.

Subsequently, as in step S21, the robot program generation system S acquires information on an allowable range in which the modified protocol can be changed (step S21).

Subsequently, as in step S22, the robot program generation system S determines whether the modified protocol can be converted for another robot without modification (step S22).

The determination whether conversion is possible will be described using an example of work including the insertion operation of inserting the tip T attached to the aspirator to the predetermined height h on the side opposite to the precipitate prc as illustrated in FIGS. 25A and 25B.

Since a single-arm six-axis robot 10C can perform this operation, it is determined that the conversion is possible.

Since a Cartesian coordinate robot 10D can perform this operation, it is determined that the conversion is possible.

Since a dual-arm six-axis robot 10B can perform this operation, it is determined that the conversion is possible.

Next, the determination whether conversion is possible will be described using an example of work including the tilting operation of tilting the microtube e3 and the tip T to the predetermined angle F and the aspiration operation of aspirating the supernatant liquid sp from the microtube e3 as illustrated in FIG. 25C.

Since the single-arm six-axis robot 10C cannot continue to tilt the microtube e3 in this way, it is determined that the conversion is impossible.

Since the Cartesian coordinate robot 10D cannot tilt the microtube e3 in this way, it is determined that the conversion is impossible.

Since the dual-arm six-axis robot 10B can perform this operation, it is determined that the conversion is possible.

Next, the determination whether conversion is possible will be described using an example of work including the operation of aspirating with the aspirator while changing the tilt of the tip T relative to the microtube e3 as illustrated in FIG. 27.

Since the single-arm six-axis robot 10C cannot tilt the microtube e3 in this way, it is determined that the conversion is impossible.

Since the Cartesian coordinate robot 10D cannot tilt the microtube e3 in this way, it is determined that the conversion is impossible.

Since the dual-arm six-axis robot 10B can perform this operation, it is determined that the conversion is possible.

Next, the determination whether conversion is possible will be described using an example of work including the operation of tilting the microtube e3 such that the supernatant liquid sp flows down and moving the tip T away from the bottom of the microtube e3 along the inner wall of the microtube e3 while tilting the microtube e3 according to the flow of the supernatant liquid sp as illustrated in FIGS. 28A and 28B.

Since the single-arm six-axis robot 10C cannot continue to tilt the microtube e3 in this way, it is determined that the conversion is impossible.

Since the Cartesian coordinate robot 10D cannot continue to tilt the microtube e3 in this way, it is determined that the conversion is impossible.

If the dual-arm six-axis robot 10B cannot perform the operation of moving the tip T away from the bottom of the microtube e3 in conjunction with the tilting of the microtube e3, it is determined that the conversion is impossible.

If it is determined that the modified protocol cannot be converted for another robot, the robot program generation system S determines whether the requirement is within an allowable range based on a difficulty level or the like, as in step S23.

Here, in the aspiration operation of aspirating the supernatant liquid sp from the microtube e3, as illustrated in FIGS. 28A and 28B, the operation of tilting the microtube e3 such that the supernatant liquid sp flows down and moving the tip T away from the bottom of the microtube e3 along the inner wall of the microtube e3 while tilting the microtube e3 according to the flow of the supernatant liquid sp is operation with a difficulty level A. As illustrated in FIG. 27, the operation of aspirating with the aspirator while changing the tilt of the tip T relative to the microtube e3 is operation with the difficulty level A. As illustrated in FIG. 25C, the operation of aspirating the supernatant liquid sp from the microtube e3 while tilting the microtube e3 and the tip T to the predetermined angle F is operation with the difficulty level A. As illustrated in FIG. 37, operation of aspirating the supernatant liquid sp from the microtube e3 while the tip T is tilted relative to the microtube e3 is operation with a difficulty level B. As illustrated in FIG. 25B, the operation of aspirating the supernatant liquid sp from the microtube e3 with the vertically set tip T shifted is operation with a difficulty level C.

If it is determined that the modified protocol can be converted for another robot, or if the requirement is within the allowable range, the robot program generation system S converts the protocol into a robot program as in step S24.

Subsequently, as in step S25, the robot program generation system S manufactures the processed product, which is an example of the object. To be specific, based on motion commands from the higher-level controller 30, the robot 10, 10B, 10C, 10D, or the like sequentially executes a series of protocols such as the protocol for preparing the arrived sample in the microtube, the protocol for precipitating DNA, RNA, or the like, and the protocol for dissolving and collecting the precipitated DNA, RNA, or the like to manufacture the processed product.

Under the control of the higher-level controller 30, the robot 10 manufactures the processed product by sequentially executing a series of protocols that are evaluated to be greater than or equal to a predetermined value when executed.

In the process of the nucleic acid extraction p13, the robot 10, 10B, 10C, 10D, or the like manufactures the processed product by sequentially executing the protocols such as the protocol for preparing the arrived sample in the microtube, the protocol for precipitating DNA, RNA, or the like, and the protocol for dissolving and collecting the precipitated DNA, RNA, or the like.

From the shipment arrival p11 to the shipment p18, according to the respective series of protocols, the processed product is manufactured from the object to be processed by the robot 10, 10B, 10C, 10D, or the like and shipped.

If the requirement is not within the allowable range, the robot program generation system S determines that the target robot cannot execute the protocol and does not allow the target robot to manufacture the processed product.

Further, the present invention is not limited to the above embodiments. The above-described embodiments are illustrative, and any embodiment that has substantially the same configuration as the technical idea described in the claims of the present invention and provides similar effects is included in the technical scope of the present invention.

REFERENCE SIGNS LIST

1: Protocol creation device
2: Conversion device (first conversion unit)
3: Determination device (determination unit, protocol conversion determination device)
4: Conversion device (second conversion unit)
10: Robot (first robot)
10B, 10C, 10D: Robot (second robot)
S: Robot program generation system

The invention claimed is:

1. A robot program generation system, comprising:
a first conversion device configured to convert a protocol representing multiple pieces of work in a field of biological engineering into a first program that is executed by a first robot;
a controller configured to:
    acquire modification information for one or both of:
        a basic operation that is basic for performing the pieces of work and is for an instrument used by the first robot for the pieces of work, and
        a supplementary operation that supplements the basic operation, and
    modify the protocol according to the modification information after the first robot performs the multiple pieces of work according to the first program;
a second conversion device configured to convert the modified protocol into a second program that is executed by a second robot different from the first robot; and
a determination device configured to determine whether the modified protocol is converted into the second program in accordance with the modified protocol based on a difficulty level of work required for an object manufactured by the second robot.

2. The robot program generation system according to claim 1, wherein the determination device makes the determination in accordance with a range in which the modified protocol is changed.

3. The robot program generation system according to claim 2, wherein the second conversion device converts the modified protocol into the second robot program within the range.

4. The robot program generation system according to claim 2, wherein the controller is further configured to set the range based on one or more of:
    an evaluation criterion for evaluating a result of performing the multiple pieces of work,
    a type of an object to be manufactured by the first robot or the second robot, and
    the difficulty level.

5. The robot program generation system according to claim 1, wherein the modification information for the basic operation includes change information of a parameter value of a basic operating parameter in the basic operation.

6. The robot program generation system according to claim 1, wherein the modification information for the supplementary operation includes additional information on the supplementary operation to be added in performing the multiple pieces of work.

7. The robot program generation system according to claim 1, wherein the modification information for the supplementary operation includes second change information to change a value set as unchanged in response to the basic operation in a code of the first program.

8. The robot program generation system according to claim 1, wherein the controller is further configured to cause a display to display a supplementary operation input screen that includes an item representing the supplementary operation and receives input for the supplementary operation.

9. The robot program generation system according to claim 1, wherein the multiple pieces of work include work of processing a cell culture.

10. The robot program generation system according to claim 1, wherein the controller is further configured to:
    acquire evaluation information obtained by evaluating a result of performing the multiple pieces of work, and
    generate the modification information in accordance with the evaluation information.

11. A manufacturing system, comprising:
a first conversion device configured to convert a protocol representing multiple pieces of work in a field of biological engineering into a first program that is executed by a first robot;
a controller configured to:
    acquire modification information for one or both of:
        a basic operation that is basic for performing the pieces of work and is for an instrument used by the first robot for the pieces of work, and
        a supplementary operation that supplements the basic operation, and
    modify the protocol according to the modification information after the first robot performs the multiple pieces of work according to the first program;
a second conversion device configured to convert the modified protocol into a second program that is executed by a second robot different from the first robot; and
a determination device configured to determine whether the modified protocol is converted into the second program in accordance with the modified protocol based on a difficulty level of work required for an object manufactured by the second robot, wherein the second robot manufactures an object in the field of biological engineering according to the second program.

\* \* \* \* \*